US012768539B2

(12) United States Patent
Zaprzalka et al.

(10) Patent No.: US 12,768,539 B2
(45) Date of Patent: Oct. 20, 2026

(54) METHODS AND APPARATUS FOR COMMUNICATING CONTROL SIGNALS IN A GRILL

(71) Applicant: Weber-Stephen Products LLC, Palatine, IL (US)

(72) Inventors: Anthony Zaprzalka, Rolling Meadows, IL (US); Jose Angel Martinez, Franklin Park, IL (US); Victor Mercado, Jr., Berwyn, IL (US); David Jonathan Eckhardt, Hampshire, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 855 days.

(21) Appl. No.: 18/167,706

(22) Filed: Feb. 10, 2023

(65) Prior Publication Data

US 2023/0258338 A1 Aug. 17, 2023

Related U.S. Application Data

(60) Provisional application No. 63/309,345, filed on Feb. 11, 2022.

(51) Int. Cl.
*F24C 3/12* (2006.01)
*A47J 37/07* (2006.01)
*G06F 3/0362* (2013.01)

(52) U.S. Cl.
CPC ........... *F24C 3/124* (2013.01); *A47J 37/0713* (2013.01); *A47J 37/0786* (2013.01); *G06F 3/0362* (2013.01)

(58) Field of Classification Search
CPC .... F24C 3/124; A47J 37/0713; A47J 37/0786; G06F 3/0362
See application file for complete search history.

(56) References Cited

U.S. PATENT DOCUMENTS

| | | | | |
|---|---|---|---|---|
| 11,924,508 B2 | 3/2024 | Eckhardt et al. | | |
| 2006/0036338 A1 | 2/2006 | Harkcom et al. | | |
| 2007/0048683 A1* | 3/2007 | Huff | F23N 1/002 | 431/278 |
| 2010/0132692 A1* | 6/2010 | Shaffer | A47J 37/0713 | 99/333 |
| 2018/0125296 A1 | 5/2018 | Gafford | | |
| 2019/0090692 A1 | 3/2019 | Laub et al. | | |
| 2021/0215344 A1 | 7/2021 | Eckhardt et al. | | |
| 2023/0092837 A1* | 3/2023 | Glennon | A47J 36/32 | 426/231 |

OTHER PUBLICATIONS

Dec. 8, 2025—Communication Pursuant to Rule 164(1) EPC in Application No. EP23753478.9.

* cited by examiner

*Primary Examiner* — Benyam Haile
(74) *Attorney, Agent, or Firm* — Banner & Witcoff, Ltd.

(57) ABSTRACT

Example methods and apparatus for communicating control signals in a gas grill are disclosed herein. An example user-interface assembly for use in a grill includes control knob, knob sensor to detect a user interaction with the control knob, lighting circuitry including a plurality of light emitting diodes, and user-interface controller circuitry to identify an addressing block connected via an input wiring harness, the knob controller to select an address to be used to communicate with a central controller of the gas grill.

13 Claims, 19 Drawing Sheets

METHODS AND APPARATUS FOR COMMUNICATING CONTROL SIGNALS IN A GRILL

FIELD OF THE DISCLOSURE

This disclosure relates generally to grills and, more specifically, to methods and apparatus for communicating control signals in a grill.

BACKGROUND

Gas grills are conventionally equipped with one or more burner(s) (e.g., one or more tube(s) configured to carry combustible gas) located within a cookbox of the grill. A gas train (e.g., implemented via one or more rigid or flexible pipe(s), tube(s), and/or conduit(s)) typically extends from a fuel source (e.g., a propane tank, or a piped (e.g., household) natural gas line) associated with the grill to a manifold of the grill, and from the manifold of the grill to respective ones of the burner(s) of the grill. One or more burner valve(s) (e.g., typically corresponding in number to the number of burner(s) of the grill) is/are coupled to and operatively positioned within the gas train between the manifold and corresponding ones of the burner(s). Each burner valve is configured to be movable between a closed position that prevents gas contained within the manifold from flowing into the corresponding burner, and an open position that enables gas contained within the manifold to flow from the manifold into the corresponding burner.

In known gas grills of the type described above, each burner valve typically has a stem that extends away from the cookbox of the grill and through a control panel of the grill, with the control panel commonly being located along a front side of the cookbox of the grill. For each burner valve, a control knob is mechanically coupled to the stem of the burner valve such that manual rotation of the control knob (e.g., by a user of the grill) mechanically causes a corresponding rotation of the stem of the burner valve. Rotating the stem of the burner valve in turn causes the burner valve to move between its closed position and its open position, thereby affecting the extent and/or the rate at which gas is able to flow from the manifold of the grill, through the burner valve of the grill, and into the corresponding burner of the grill. Such known gas grills accordingly have a mechanical control architecture with regard to the relationship between the position(s) of the one or more control knob(s) of the grill and the flow of gas into the corresponding one or more burner(s) of the grill.

Figure 1:
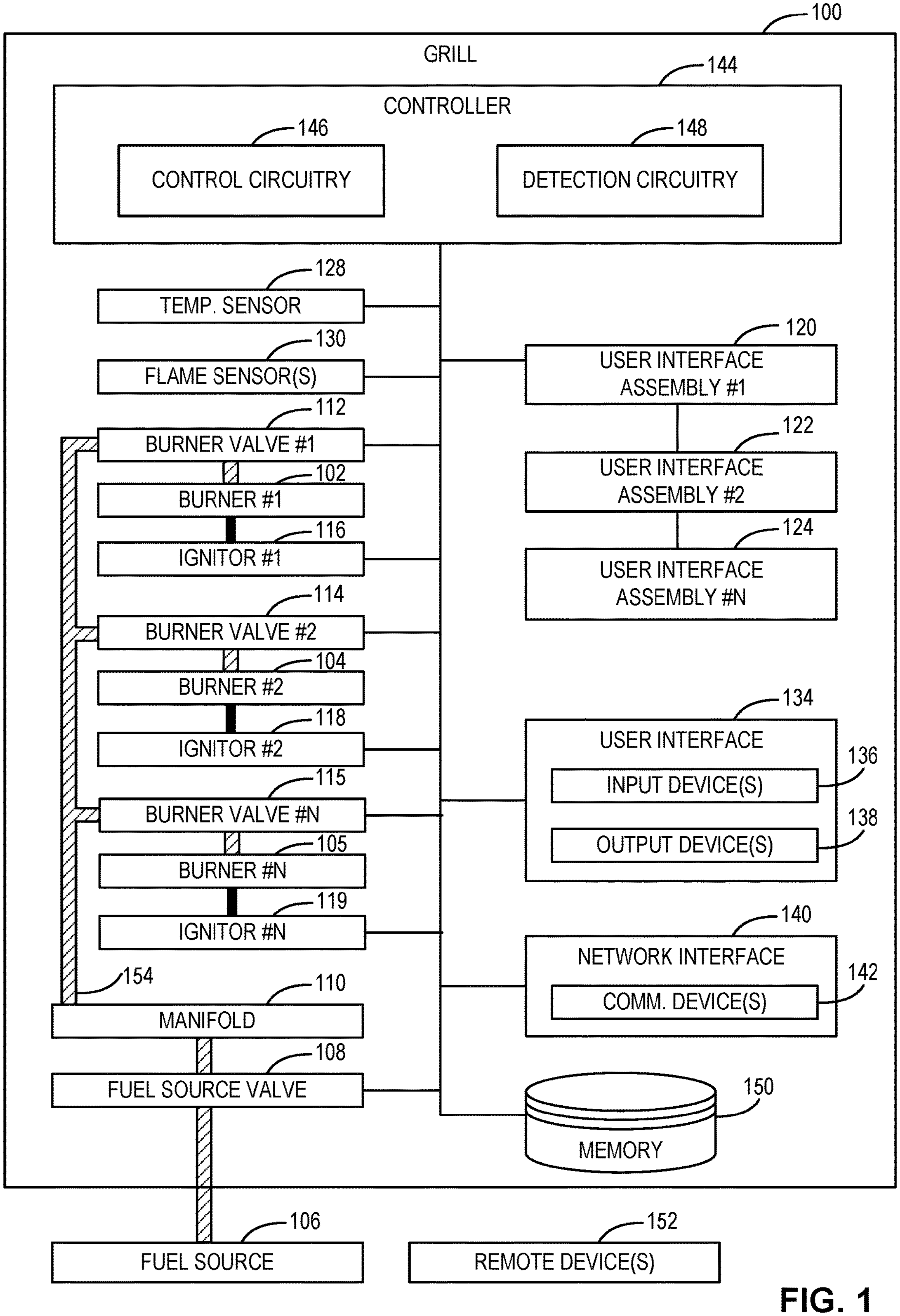
FIG. 1 is a block diagram of an example grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Conventional gas grills of the type described above have a mechanical control architecture with regard to the relationship between the position(s) of one or more control knob(s) of the grill and the flow of gas into a corresponding one or more burner(s) of the grill. In this regard, such known gas grills include one or more burner valve(s), each having a stem that extends away from a cookbox of the grill and through a control panel of the grill, with the control panel commonly being located along a front side of the cookbox of the grill. For each burner valve, a control knob is mechanically coupled to the stem of the burner valve such that manual rotation of the control knob (e.g., by a user of the grill) mechanically causes a corresponding rotation of the stem of the burner valve. Rotating the stem of the burner valve in turn causes the burner valve to move between its closed position and its open position, thereby affecting the extent and/or the rate at which gas is able to flow from a manifold of the grill, through the burner valve of the grill, and into a corresponding burner of the grill.

Beyond grills that utilize gas (e.g., natural gas, propane, etc.) as a fuel source, other types of grills also exist that may use other types of fuel. Such grills may include, for example, charcoal grills, pellet grills, wood-fired grills, electric grills, etc. While different fuels may be used, such grills may also benefit from the use of control systems to, for example, control a rate at which fuel and/or heat is provided to a cookbox, control a rate of combustion, provide user interfaces, etc. While techniques disclosed herein are described in the context of a gas grill, such techniques are also equally applicable for use in non-gas grills.

In contrast to conventional gas grills that implement mechanical control architectures of the type described above, the methods and apparatus disclosed herein advantageously provide "control-by-wire" architectures for grills that eliminate the above-described mechanical connection which conventionally exists between each control knob of the grill and each corresponding burner valve of the grill. In some examples, grills disclosed herein include a burner valve, a control knob, a rotary encoder, and a controller (e.g., a central controller).

In some other implementations, a fuel control system may be used in place of a burner valve. The fuel control system may control providing of fuel to a cookbox of the grill and/or a rate at which such fuel is to be combusted. For example, the fuel control system may include an auger to feed fuel (e.g., pellets) to the cookbox and/or other location for combustion, a fan and/or vent controller to control airflow, etc.

In example grills that include a burner valve, a control knob, a rotary encoder, and a controller, the burner valve is movable between an open position and a closed position. The rotary encoder includes a rotatable portion and a fixed portion. The control knob is mechanically coupled to the rotatable portion of the rotary encoder, which is rotatable relative to the fixed portion of the rotary encoder. No mechanical connection exists, however, between the control knob and the burner valve.

In this regard, the rotary encoder is configured to detect a rotational position of the control knob. The rotational position of the control knob corresponds to a rotational position of the rotatable portion of the rotary encoder relative to the fixed portion of the rotary encoder. The controller is in electrical communication with the rotary encoder. The controller is also in electrical communication with the burner valve, which is implemented as a controllable electric valve (e.g., a solenoid valve). The controller is configured to determine a target position of the burner valve based on the rotational position of the control knob. The controller is further configured to instruct the burner valve to move to the target position, thereby implementing a "control-by-wire" architecture with regard to the relationship between the position(s) of the one or more control knob(s) of the grill and the flow of gas into the corresponding one or more burner(s) of the grill.

In some examples, the controller is further configured to instruct one or more lighting modules of the grill to present a notification indicating at least one of the rotational position of the control knob or the target position of the burner valve. In some such examples, the lighting module(s) includes a light source, and presenting the notification includes illuminating the light source. In other such examples, the lighting module(s) includes a light source, and presenting the notification includes pulsing the light source. In some examples, the controller is further configured to instruct one or more output devices of a user interface of the grill to present a notification indicating at least one of the rotational position of the control knob or the target position of the burner valve. In some examples, the controller is further configured to instruct a notification indicating at least one of the rotational position of the control knob or the target position of the burner valve to be presented at a remote device in electrical communication with the grill.

In some examples, the example grill includes user-interface assemblies that include user interface elements (e.g., knobs) that are used to control the position of a respective burner valve. Each user-interface assembly further includes a lighting module to display information about the status of the grill (e.g., a status with respect to the corresponding burner). In a grill system, certain procedures, such as igniting a burner, can cause significant electrical noise that may, in some examples, interfere with the ability of the controller to communicate with the user-interface assembly(ies). It is therefore a goal to reduce the amount of wiring necessary to manufacture the grill (e.g., to reduce locations in which electrical noise can be introduced). In examples disclosed herein, user-interface assemblies are wired in a daisy-chained configuration. That is, instead of connecting each user-interface assembly directly to a controller and/or a central bus, each user-interface assembly is connected to a sequentially previous user-interface assembly.

In examples disclosed herein, the controller communicates with the user-interface assemblies via a controller bus and a lighting bus. In examples disclosed herein, the controller bus is implemented using an inter-integrated circuit communication protocol, and the lighting bus is implemented using a single wire communication protocol (e.g., using a WS2811 communication protocol). However, such communication protocols are intended to facilitate on-device communications (e.g., communications on a printed circuit board (PCB)), and are not intended to be carried over wire harnesses more than a couple of inches as wiring of such length can be easily distorted by interference.

In some examples, instead of using two separate communication buses (e.g., the controller bus and the lighting bus), a single communication bus may be used. Such a single bus may convey both lighting and control information between the central controller and the user-interface assemblies. Such communication may be accomplished using the inter-integrated circuit communication protocol noted above, or any other communication protocol that facilitates communication of information between two devices including, for example, a serial communication protocol (e.g., RS-485), an Ethernet communication protocol, wireless communication protocols (e.g., Bluetooth, Wi-Fi), etc.

In some examples, such communication protocols can additionally or alternatively be used to convey status and/or control information to/from other peripheral devices associated with the grill including, for example, sensor information (e.g., lid sensor information indicating whether a lid of a grill is open or closed, vent position information, temperature information, etc.) and/or control information (e.g., information for controlling a position of an actuator/valve, temperature information for display on an output device, etc.).

In example approaches disclosed herein, signals are communicated using a differential pair signal, which increases the resistance to interference. In this manner, both the controller bus and the lighting bus are implemented using differential wiring. Wiring harnesses can therefore be of a longer length (e.g., multiple feet), enabling device-to-device connections to be made in the chain, and allowing greater flexibility of placement for the electronics. In the context of a grill, this allows for pre-wiring of a front panel with a single connector originating from a first knob in the chain to connect to a controlling device.

In examples disclosed herein, the controller bus is implemented using a node-drop to each user-interface assembly. In contrast, the lighting bus is implemented as a pass through from one user-interface assembly to another knob assembly. Such an approach simplifies wire harnessing and allows each knob to self-identify its respective position. Alternate approaches could have signal integrity issues, or require each knob to be unique and have a larger quantity of harness connections.

The above-identified features as well as other advantageous features of example methods and apparatus for controlling fuel flow in grills based on position data detected via user interface sensors (e.g., rotary encoders) as disclosed herein are further described below in connection with the figures of the application. As used herein in a mechanical context, the term "configured" means sized, shaped, arranged, structured, oriented, positioned, and/or located. For example, in the context of a first object configured to fit within a second object, the first object is sized, shaped, arranged, structured, oriented, positioned, and/or located to fit within the second object. As used herein in an electrical and/or computing context, the term "configured" means arranged, structured, and/or programmed. For example, in the context of a controller configured to perform a specified operation, the controller is arranged, structured, and/or programmed (e.g., based on machine-readable instructions) to perform the specified operation. As used herein, the phrase "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, the term "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

FIG. 1 is a block diagram of an example grill 100 constructed in accordance with the teachings of this disclosure. The grill 100 of FIG. 1 is a gas grill including a plurality of burners. In other examples, the grill 100 can be implemented as a different type of grill having a controllable heat source (e.g., a pellet grill, an electric grill, etc.). In the illustrated example of FIG. 1, the grill 100 includes an example first burner 102 and an example second burner 104. In other examples, the grill 100 can include one or more other burner(s) (e.g., a third burner, a fourth burner, a fifth burner, etc.) in addition to the first burner 102 and the second burner 104 shown and described in connection with FIG. 1. The first burner 102 and the second burner 104 of FIG. 1 are each constructed as a burner tube (e.g., a linear burner tube) including a gas inlet for receiving a flow of combustible gas, and further including a plurality of apertures configured to emit flames generated in response to ignition of the gas flowing into and/or through the burner tube. In some examples, additional burners may be implemented, as is represented by burner #N 105 of FIG. 1. One or more of the additional burner(s) 105 may be structured, configured, and/or implemented in a manner that is substantially similar to the first burner 102 and/or the second burner 104 of FIG. 1.

Figure 2:
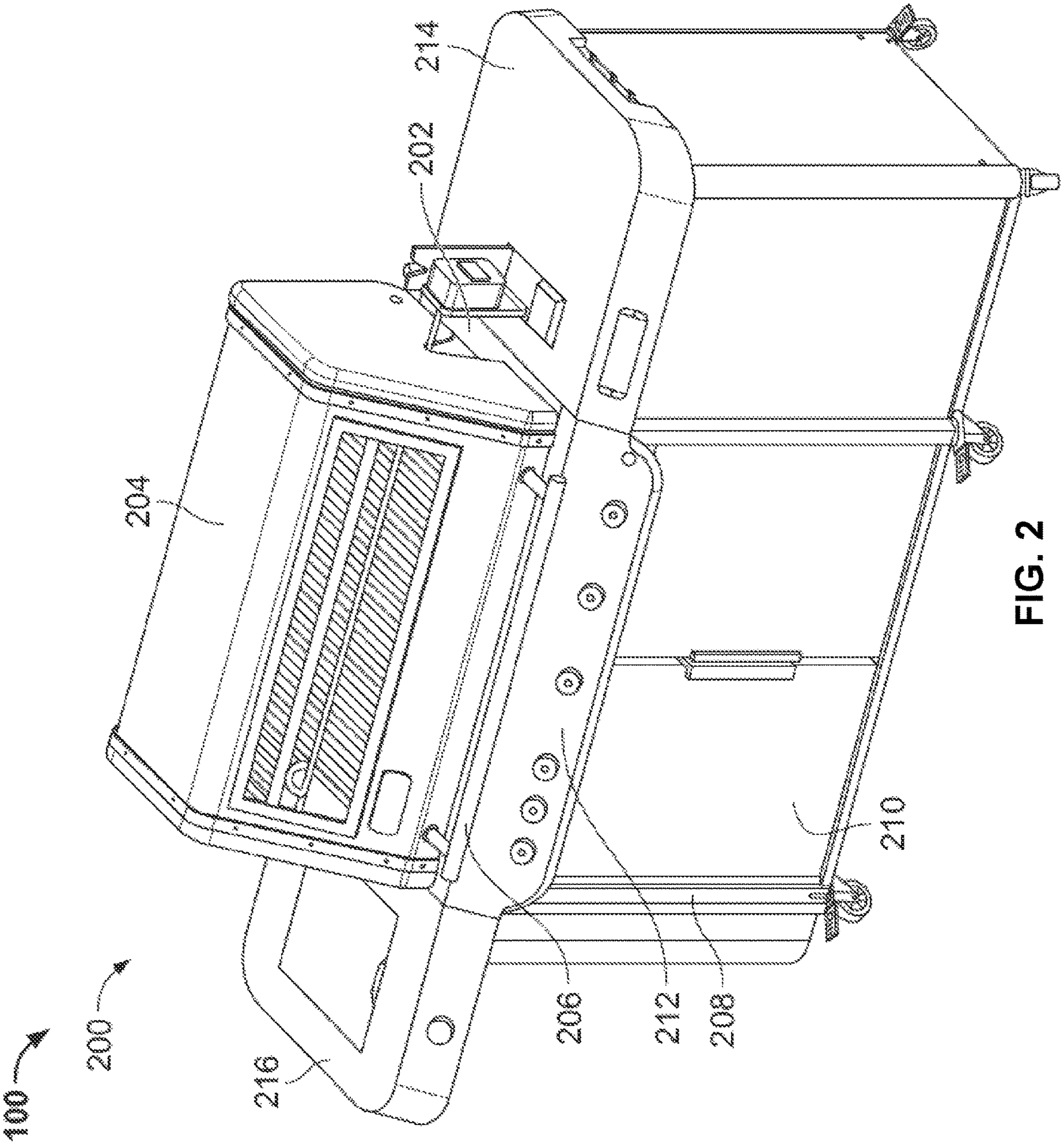
FIG. 2 is a perspective view of an example implementation of the grill of FIG. 1, with an example lid of the grill shown in an example closed position relative to an example cookbox of the grill.
Figure 3:
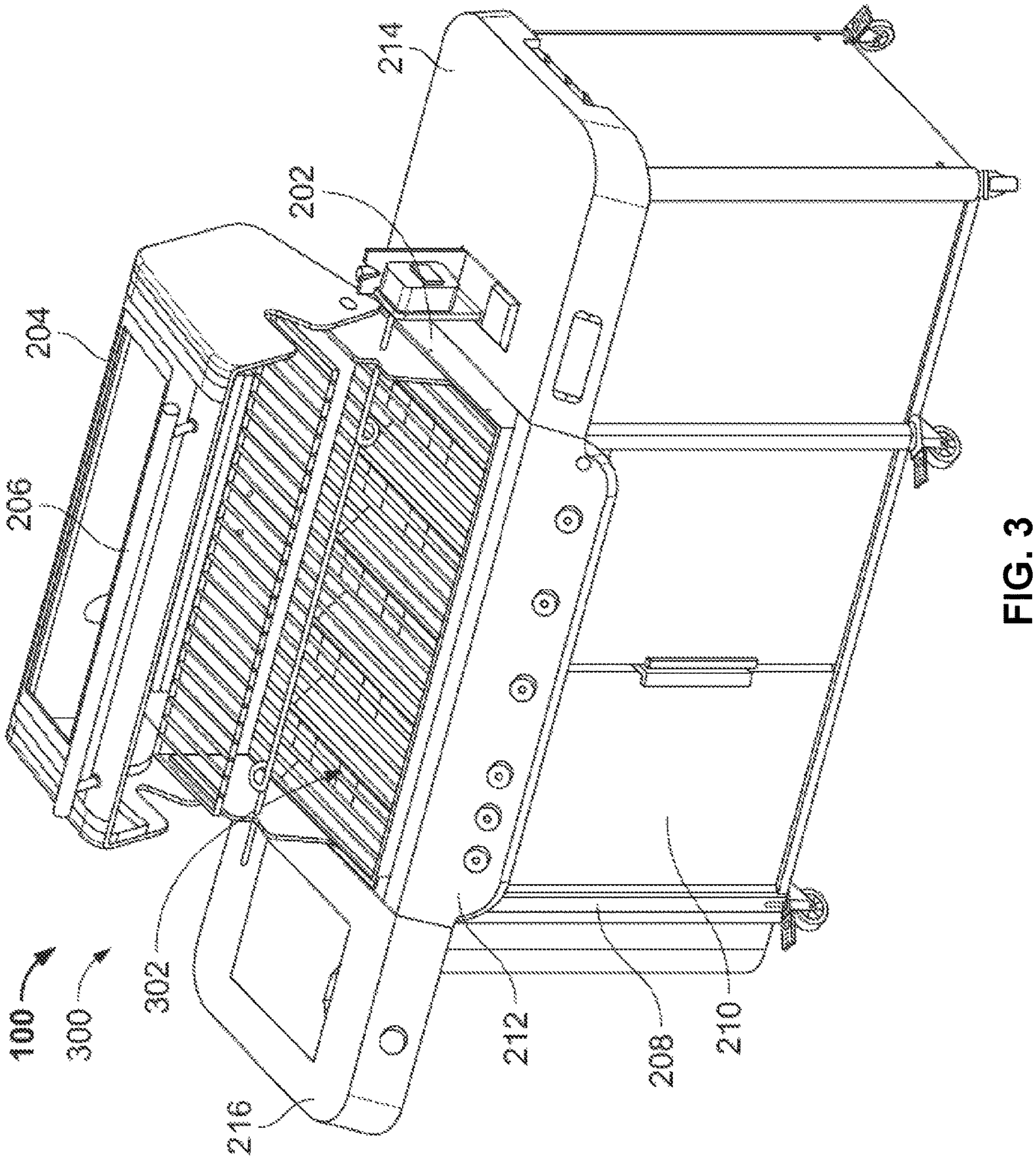
FIG. 3 is a perspective view of the implementation of the grill shown in FIG. 2, with the lid of the grill shown in an example open position relative to the cookbox of the grill.
Figure 4A:
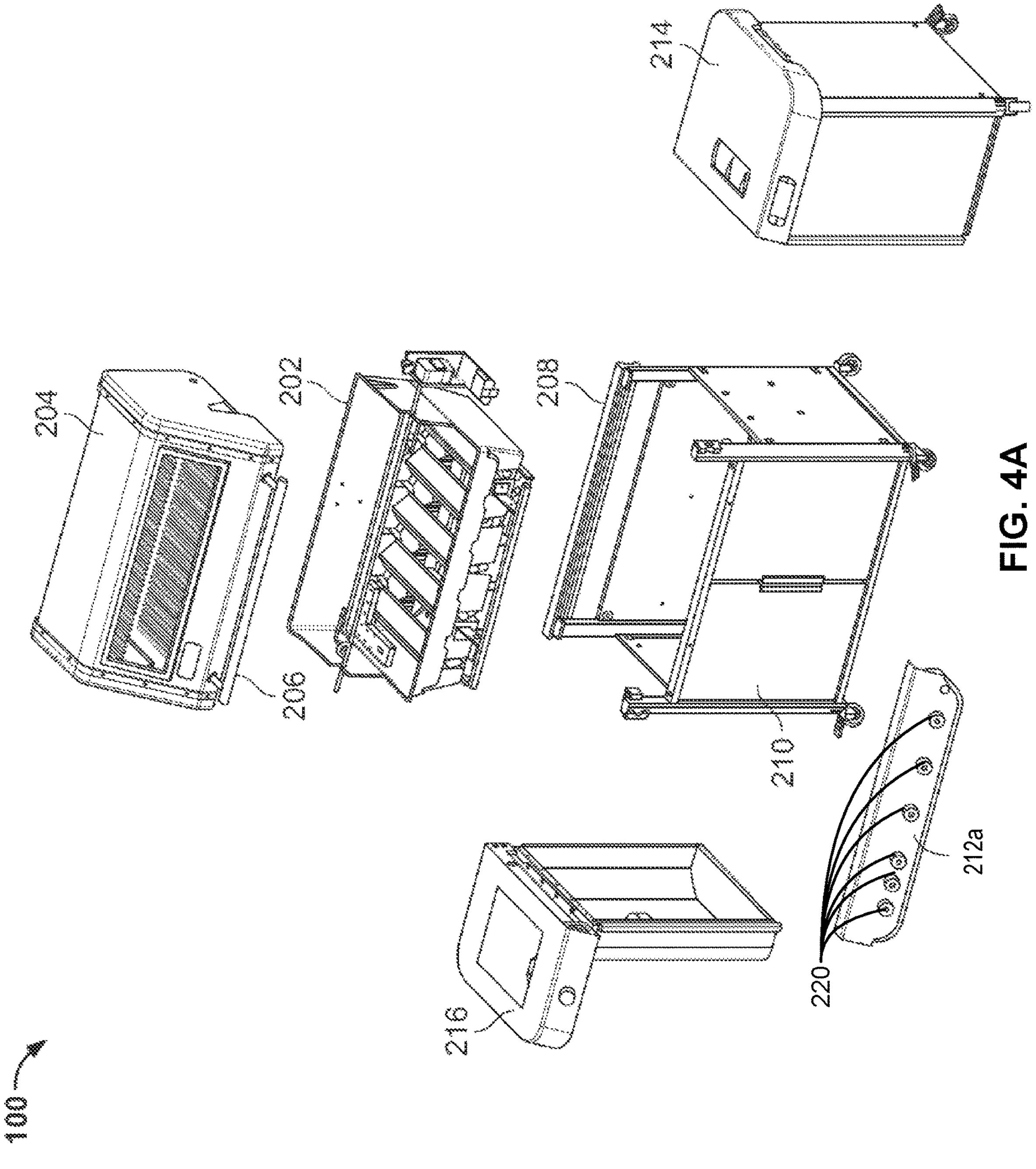
FIG. 4A is an exploded view of the implementation of the grill shown in FIGS. 2 and 3.
Figure 4B:
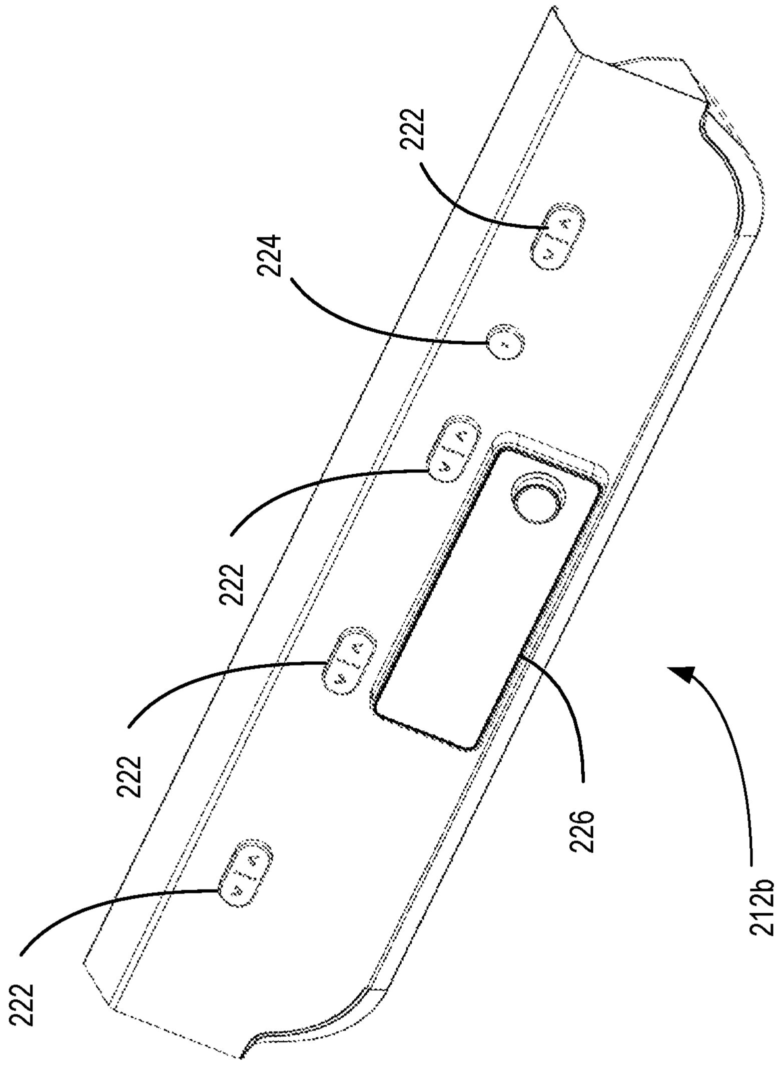
FIG. 4B is an alternative implementation 212*b* of the example control panel of FIG. 4A.
Figure 5:
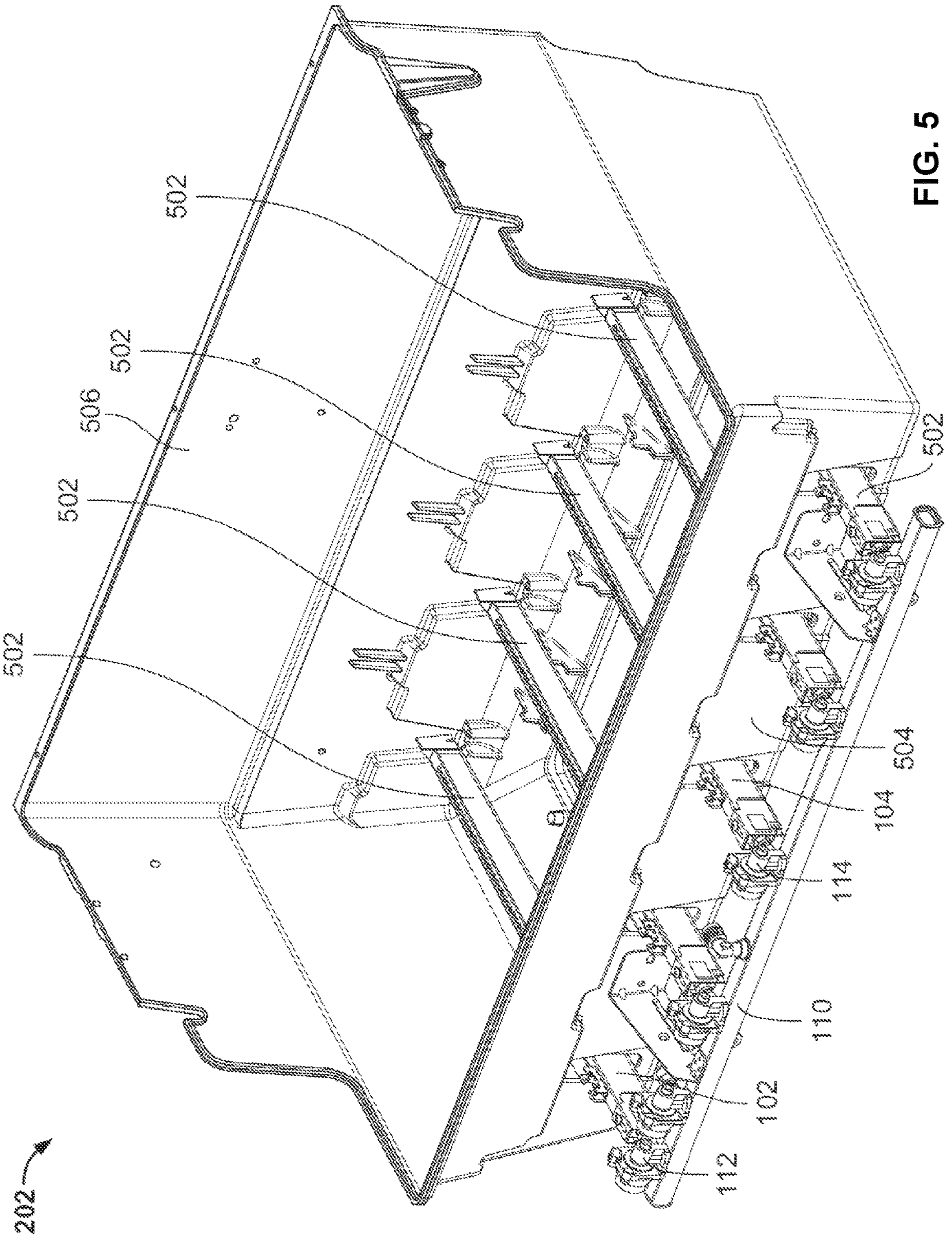
FIG. 5 is a perspective view of the cookbox of the implementation of the grill shown in FIGS. 2-4A.

FIG. 2 is a perspective view of an example implementation of the grill 100 of FIG. 1, with an example lid 204 of the grill 100 shown in an example closed position 200 relative to an example cookbox 202 of the grill 100. FIG. 3 is a perspective view of the implementation of the grill 100 shown in FIG. 2, with the lid 204 of the grill 100 shown in an example open position 300 relative to the cookbox 202 of the grill 100. FIG. 4A is an exploded view of the implementation of the grill 100 shown in FIGS. 2 and 3. FIG. 4B is an alternative implementation **212*b* of the example control panel 212*a* of FIG. 4A. FIG. 5 is a perspective view of the cookbox 202 of the implementation of the grill 100 shown in FIGS. 2-4A**.

The cookbox 202 of the grill 100 supports, carries, and/or houses the burners (e.g., the first burner 102 and the second burner 104) of the grill 100, with respective ones of the burners being spaced apart from one another within the cookbox 202. As shown in FIG. 5, the cookbox 202 supports, carries, and/or houses a total of five example burners 502 (e.g., including the first burner 102 and the second burner 104 of FIG. 1), with each of the five burners 502 being spaced apart from one another within the cookbox 202. In other examples, the cookbox 202 can support, carry, and/or house a different number (e.g., two, three, four, six, etc.) of burners 502. In the illustrated example of FIGS. 2-5, each of the burners 502 is constructed as a linear burner tube positioned in a front-to-rear orientation within the cookbox 202 (e.g., extending from a front wall 504 of the cookbox 202 to a rear wall 506 of the cookbox 202). In other examples, one or more of the burner(s) 502 can have a different shape (e.g., a non-linear shape such as a P-tube), and/or can have a different orientation (e.g., a left-to-right orientation) within the cookbox 202. It should accordingly be understood that the cookbox configuration shown in FIGS. 2-5 is but one example of a cookbox 202 that can be implemented as part of the grill 100 of FIG. 1.

The lid 204 of the grill 100 is configured to cover and/or enclose the cookbox 202 of the grill 100 when the lid is in a closed position (e.g., the closed position 200 of FIG. 2). In the illustrated example of FIGS. 2-4A, the lid 204 is movably (e.g., pivotally) coupled to the cookbox 202 such that the lid 204 can be moved (e.g., pivoted) relative to the cookbox 202 between a closed position (e.g., the closed position 200 of FIG. 2) and an open position (e.g., the open position 300 of FIG. 3). In other examples, the lid 204 of the grill 100 can instead be removably positioned on the cookbox 202 of the grill 100 without there being any direct mechanical coupling between the lid 204 and the cookbox 202. In some such other examples, the lid 204 can be movably (e.g., pivotally) coupled to one or more structure(s) of the grill 100 other than the cookbox 202. For example, the lid 204 can be movably (e.g., pivotally) coupled to a frame, to a cabinet, and/or to one or more side table(s) of the grill 100. Movement of the lid 204 of the grill 100 between the closed position 200 shown in FIG. 2 and the open position 300 shown in FIG. 3 can be facilitated via user interaction with an example handle 206 of the grill 100 that is coupled to the lid 204.

In the illustrated example of FIGS. 2-4A, the cookbox 202 and the lid 204 of the grill 100 collectively define an example cooking chamber 302 configured to cook one or more item(s) of food. The cooking chamber 302 of the grill 100 becomes accessible to a user of the grill 100 when the lid 204 of the grill 100 is in the open position 300 shown in FIG. 3. Conversely, the cooking chamber 302 of the grill 100 is generally inaccessible to the user of the grill 100 when the lid 204 of the grill 100 is in the closed position 200 shown in FIG. 2. User access to the cooking chamber 302 of the grill 100 may periodically become necessary, for example, to add an item of food to the cooking chamber 302 (e.g., at or toward the beginning of a cook), to remove an item of food from the cooking chamber 302 (e.g., at or toward the end of a cook), and/or to flip, rotate, relocate, or otherwise move an item of food within the cooking chamber 302 (e.g., during the middle of a cook).

As further shown in FIGS. 2-4A, the grill 100 includes an example frame 208 that supports the cookbox 202 of the grill 100. In the illustrated example of FIGS. 2-4A, the frame 208 forms an example cabinet 210 within which one or more component(s) of the grill 100 can be housed and/or stored. In other examples, the cabinet 210 of the grill 100 can be omitted in favor of an open-space configuration of the frame 208. As further shown in FIGS. 2-4B, the grill 100 includes an example control panel 212*a* or 212*b* located along the front portion of the cookbox 202, the frame 208, and/or the cabinet 210 of the grill 100, an example first side table 214 located on a first side (e.g., a right side) of the cookbox 202, the frame 208, and/or the cabinet 210 of the grill 100, and an example second side table 216 located on a second side (e.g., a left side) of the cookbox 202, the frame 208, and/or the cabinet 210 of the grill 100. Various components of the grill 100 of FIG. 1 described herein can be supported by, carried by, housed by, mounted to, and/or otherwise coupled to at least one of the cookbox 202, the lid 204, the handle 206, the frame 208, the cabinet 210, the control panel 212*a* or 212*b*, the first side table 214, and/or the second side table 216 of the grill 100.

In the illustrated example of FIG. 4A, the control panel 212*a* utilizes rotary knobs 220. As shown in the illustrated example of FIG. 4B, the control panel 212*b* may utilize buttons 222. In the illustrated example of FIG. 4B, an additional ignitor button 224 is shown that may be used to trigger ignition of the grill. In the illustrated example of FIG. 4B, a control panel 226 is shown that may be used to present status information to a user of the grill.

Returning to the illustrated example of FIG. 1, the grill 100 of FIG. 1 receives fuel from a fuel source 106. The example grill 100 of FIG. 1 includes an example fuel source valve 108, an example manifold 110, an example first burner valve 112, an example second burner valve 114, an example first ignitor 116, an example second ignitor 118, example user-interface assemblies 120, 122, 124, an example temperature sensor 128, one or more example flame sensor(s) 130, one or more example lighting module(s) 132, an example user interface 134 (e.g., including one or more example input device(s) 136 and one or more example output device(s) 138), an example network interface 140 (e.g., including one or more example communication device(s) 142), an example controller 144 (e.g., including example control circuitry 146 and example detection circuitry 148), and an example memory 150. The grill 100 of FIG. 1 is configured to communicate (e.g., wirelessly communicate) with one or more example remote device(s) 152, as further described below.

The grill 100 of FIG. 1 includes a control system for controlling, managing, performing, and/or otherwise carrying out one or more operation(s) of the grill 100 including, for example, for presenting safety-based temperature status notifications associated with the grill 100. In the illustrated example of FIG. 1, the control system of the grill 100 includes the fuel source valve 108, the first burner valve 112, the second burner valve 114, the first ignitor 116, the second ignitor 118, the user-interface assemblies 120, 122, 124, the temperature sensor 128, the flame sensor(s) 130, the user interface 134 (e.g., including the input device(s) 136 and the output device(s) 138), the network interface 140 (e.g., including the communication device(s) 142), the controller 144 (e.g., including the control circuitry 146 and the detection circuitry 148), and the memory 150. In other examples, one or more of the aforementioned components of the grill 100 can be omitted from the control system of the grill 100. For example, the fuel source valve 108 can be omitted from the control system of the grill 100 in instances where the fuel source valve 108 is not configured to be electrically controlled and/or electrically actuated by the controller 144, with the fuel source valve 108 instead being configured only for manual control and/or manual actuation. In still other examples, the control system of the grill 100 can further include the remote device(s) 152 that are configured to communicate (e.g., wirelessly communicate) with the grill 100.

The control system of the grill 100 of FIG. 1 is powered and/or operated by a power source. For example, the electrical components that form the control system of the grill 100 can be powered and/or operated by DC power supplied via one or more on-board or connected batteries of the grill 100. As another example, the electrical components that form the control system of the grill 100 can alternatively be powered and/or operated by AC power supplied via household electricity or wall power to which the grill 100 is connected. The grill 100 includes a power button (e.g., a power switch) that is configured to enable (e.g., power on) or disable (e.g., power off) the control system of the grill 100 in response to the power button being manually actuated by a user of the grill 100.

The grill 100 of FIG. 1 further includes an example gas train 154 that extends from the fuel source 106 to the manifold 110 of the grill 100, and from the manifold 110 to respective ones of the first burner 102 and the second burner 104 of the grill 100. The gas train 154 can be implemented via one ore more conduit(s) (e.g., one or more rigid or flexible pipe(s), tube(s), etc.) that are configured to carry combustible gas from the fuel source 106 to the first burner 102 and/or the second burner 104 of the grill 100. In some examples, the fuel source 106 is implemented as a fuel tank (e.g., a propane tank) containing combustible gas. In such examples, the fuel source 106 will typically be located partially or fully within the cabinet 210 of the grill 100, partially or fully within a spatial footprint formed by the frame 208 of the grill 100, below the cookbox 202 of the grill 100 and partially or fully within a spatial footprint formed by the cookbox 202 of the grill 100, or below the cookbox 202 of the grill 100 and partially or fully within a spatial footprint formed by the first side table 214 or the second side table 216 of the grill 100. In other examples, the fuel source 106 can instead be implemented as a piped (e.g., household) natural gas line that provides an accessible flow of combustible gas.

The fuel source valve 108 of FIG. 1 is coupled to and operatively positioned within the gas train 154 between the fuel source 106 and the manifold 110 of the grill 100. The fuel source valve 108 is configured to be movable between a closed position that prevents gas contained within the fuel source 106 from flowing into the manifold 110, and an open position that enables gas contained within the fuel source 106 to flow from the fuel source 106 into the manifold 110. In the illustrated example of FIG. 1, the fuel source valve 108 is operatively coupled to (e.g., in electrical communication with) the controller 144 of the grill 100, with the fuel source valve 108 being implemented as a controllable electric valve (e.g., a solenoid valve) that is configured to transition from the closed position to the open position, and vice-versa, in response to instructions, commands, and/or signals (e.g., a supply of current) generated by the controller 144. In other examples, the fuel source valve 108 can instead be implemented as a valve having a knob or a lever operatively coupled (e.g., mechanically coupled) thereto, with the knob or the lever being configured to be electrically actuated (e.g., via a motor) in response to instructions, commands, and/or signals generated by the controller 144 of the grill 100. In still other examples, the fuel source valve 108 may have no electrically-controllable components, in which case actuation of the fuel source valve 108 from the closed position to the open position, and vice-versa, occurs in response to a user of the grill 100 manually actuating a knob or a lever that is operatively coupled (e.g., mechanically coupled) to the fuel source valve 108.

The first burner valve 112 of FIG. 1 is coupled to and operatively positioned within the gas train 154 between the manifold 110 and the first burner 102 of the grill 100. In some examples, a gas inlet of the first burner valve 112 is located within the manifold 110, and a gas outlet of the first burner valve 112 is located within the first burner 102. The first burner valve 112 is configured to be movable between a closed position that prevents gas contained within the manifold 110 from flowing into the first burner 102, and an open position that enables gas contained within the manifold 110 to flow from the manifold 110 into the first burner 102. In the illustrated example of FIG. 1, the first burner valve 112 is operatively coupled to (e.g., in electrical communication with) the controller 144 of the grill 100, with the first burner valve 112 being is implemented as a controllable electric valve (e.g., a solenoid valve) that is configured to transition from the closed position to the open position, and vice-versa, in response to instructions, commands, and/or signals (e.g., a supply of current) generated by the controller 144. In some examples, the first burner valve 112 is controllable to any position (e.g., infinite position control) between the above-described closed position (e.g., fully closed) and the above-described open position (e.g., fully open). In such examples, the first burner valve 112 of FIG. 1 may be controlled to various positions to achieve different specified temperatures (e.g., different setpoint temperatures) within the cooking chamber 302 of the grill 100, as may be required by the various ordered steps, instructions, and/or operations of one or more selectable cook program(s) to be implemented via the control system of the grill 100.

The second burner valve 114 of FIG. 1 is coupled to and operatively positioned within the gas train 154 between the manifold 110 and the second burner 104 of the grill 100. In some examples, a gas inlet of the second burner valve 114 is located within the manifold 110, and a gas outlet of the second burner valve 114 is located within the second burner 104. The second burner valve 114 is configured to be movable between a closed position that prevents gas contained within the manifold 110 from flowing into the second burner 104, and an open position that enables gas contained within the manifold 110 to flow from the manifold 110 into the second burner 104. In the illustrated example of FIG. 1, the second burner valve 114 is operatively coupled to (e.g., in electrical communication with) the controller 144 of the grill 100, with the second burner valve 114 being implemented as a controllable electric valve (e.g., a solenoid valve) that is configured to transition from the closed position to the open position, and vice-versa, in response to instructions, commands, and/or signals (e.g., a supply of current) generated by the controller 144. In some examples, the second burner valve 114 is controllable to any position (e.g., infinite position control) between the above-described closed position (e.g., fully closed) and the above-described open position (e.g., fully open). In such examples, the second burner valve 114 of FIG. 1 may be controlled to various positions to achieve different specified temperatures (e.g., different setpoint temperatures) within the cooking chamber 302 of the grill 100, as may be required by the various ordered steps, instructions, and/or operations of one or more selectable cook program(s) to be implemented via the control system of the grill 100.

As described above, the first burner valve 112 and the second burner valve 114 of FIG. 1 respectively differ from known burner valves of conventional gas grills in that neither the first burner valve 112 nor the second burner valve 114 includes a stem that is mechanically coupled to a user-accessible control knob of the grill, whereby the control knob traditionally facilitates manual control and/or manual actuation of the operable position of the burner valve. The first burner valve 112 and the second burner valve 114 of FIG. 1 are instead only controllable and/or actuatable via the "control-by-wire" functionality further described herein.

In some examples, additional burner valves may be implemented, as is represented by burner valve #N 115 of FIG. 1. One or more of the additional burner valve(s) 115 may be structured, configured, and/or implemented in a manner that is substantially similar to the first burner valve 112 and/or the second burner valve 114 of FIG. 1.

The first ignitor 116 of FIG. 1 is mechanically coupled and/or operatively positioned relative to the first burner 102 of the grill 100. More specifically, the first ignitor 116 is located adjacent the first burner 102 at a position that enables the first ignitor 116 to ignite combustible gas as the gas emanates from within the first burner 102 via apertures formed in the first burner 102. The first ignitor 116 of FIG.

1 is operatively coupled to (e.g., in electrical communication with) the controller 144 of the grill 100, with the first ignitor 116 being configured to generate sparks (e.g., via a spark electrode of the first ignitor 116) and/or otherwise induces ignition of the combustible gas in response to an instruction, a command, and/or a signal generated by the controller 144.

The second ignitor 118 of FIG. 1 is mechanically coupled and/or operatively positioned relative to the second burner 104 of the grill 100. More specifically, the second ignitor 118 is located adjacent the second burner 104 at a position that enables the second ignitor 118 to ignite combustible gas as the gas emanates from within the second burner 104 via apertures formed in the second burner 104. The second ignitor 118 of FIG. 1 is operatively coupled to (e.g., in electrical communication with) the controller 144 of the grill 100, with the second ignitor 118 being configured to generate sparks (e.g., via a spark electrode of the second ignitor 118) and/or otherwise induces ignition of the combustible gas in response to an instruction, a command, and/or a signal generated by the controller 144.

In some examples, the first ignitor 116 and/or the second ignitor 118 of FIG. 1 can respectively be structured, configured, and/or implemented as one of the various ignitors described in U.S. patent application Ser. No. 17/144,038, filed on Jan. 7, 2021. In such examples, the first ignitor 116 and/or the second ignitor 118 of FIG. 1 can respectively be mechanically coupled to a corresponding one of the first burner 102 and/or the second burner 104 of the grill 100 via a ceramic harness as described in U.S. patent application Ser. No. 17/144,038. The entirety of U.S. patent application Ser. No. 17/144,038 is hereby incorporated by reference herein.

In some examples, additional ignitors may be implemented, as is represented by ignitor #N 119 of FIG. 1. One or more of the additional ignitor(s) 119 may be structured, configured, and/or implemented in a manner that is substantially similar to the first ignitor 116 and/or the second ignitor 118 of FIG. 1.

The example grill 100 of FIG. 1 includes user-interface assemblies 120, 122, 124. As described in greater detail below, each user-interface assembly includes a knob that is used to control the position of a respective burner valve. Each user-interface assembly further includes a lighting module to display information about the status of the grill (e.g., a status with respect to the corresponding burner). In a grill system, certain procedures, such as igniting a burner, can cause significant electrical noise that may, in some examples, interfere with the ability of the controller 144 to communicate with the user-interface assembly(ies). It is therefore a goal to reduce the amount of wiring necessary to manufacture the grill 100. In the illustrated example of FIG. 1, the user-interface assemblies 120, 122, 124 are wired in a daisy-chained configuration. That is, instead of connecting each user-interface assembly to the controller 144 and/or a central bus, each user-interface assembly 120, 122, 124 is connected to a sequentially previous user-interface assembly (or the controller 144 in the case of a first user-interface assembly).

In examples disclosed herein, the controller 144 communicates with the user interface assemblies via a controller bus and a lighting bus. In examples disclosed herein, the controller bus is implemented using an inter-integrated circuit communication protocol, and the lighting bus is implemented using a single wire communication protocol (e.g., using a WS2811 communication protocol). However, such communication protocols are intended to facilitate on-device communications (e.g., communications on a printed circuit board (PCB)), and are not intended to be carried over wire harnesses more than a couple of inches as wiring of such length can be easily distorted by interference.

In example approaches disclosed herein, signals are communicated using a differential pair signal, which increases the resistance to interference. In this manner, both the controller bus and the lighting bus are implemented using differential wiring. Wiring harnesses can therefore be of a longer length (e.g., multiple feet), enabling device-to-device connections to be made in the chain, and allowing greater flexibility of placement for the electronics. In the context of a grill, this allows for pre-wiring of a front panel with a single connector originating from a first knob in the chain to connect to a controlling device (e.g., the controller 144).

In examples disclosed herein, the controller bus is implemented using a node-drop to each user-interface assembly 120, 122, 124. In contrast, the lighting bus is implemented as a pass through from one user-interface assembly to another user-interface assembly (originating at the controller 144). Such an approach simplifies wire harnessing and allows each user interface assembly to self-identify its respective position. Alternate approaches could have signal integrity issues, or require each user interface assembly to be unique and have a larger quantity of harness connections.

As noted above, the example grill 100 includes user-interface assemblies 120, 122, 124. As described in further detail below in connection with FIG. 6, the user-interface assemblies 120, 122, 124 communicate with the controller 144 to provide inputs to the controller 144, and/or provide outputs to the user (e.g., via lighting modules included in the user-interface assemblies). The controller 144 can, in turn, use information provided from the user-interface assemblies 120, 122, 124 to control the burner valves 112, 114. In the illustrated example of FIG. 1, each one of the user-interface assemblies 120, 122, 124 corresponds with a respective one of the burner valves 112, 114, 115 and/or a respective one of the ignitors 116, 118, 119. However, in some examples, a user-interface assembly may correspond to multiple burner valves. Thus, while conventional multi-burner gas grills typically include a plurality of control knobs (e.g., located on or along a control panel of the grill), with each control knob being physically associated with a corresponding one of the burners of the gas grill by virtue of a mechanical connection existing between the control knob and a stem of a corresponding burner valve (e.g., such that rotation of the control knob by a user of the grill opens, closes, or otherwise adjusts the position of the burner valve), by contrast, the grill 100 of FIG. 1 implements a "control-by-wire" architecture. Such a "control-by-wire" architecture eliminates the mechanical connection in favor of electrical control.

Although the first user-interface assembly 120 of FIG. 1 is not mechanically coupled to the first burner valve 112 of FIG. 1, rotation of the control knob of the first user-interface assembly 120 by a user of the grill 100 can nonetheless cause the first burner valve 112 to open, close, or otherwise adjust its position. In this regard, the controller 144 of FIG. 1 is configured to interpret different rotational positions of a control knob (and/or other user interface element) of the first user-interface assembly 120 of FIG. 1 (e.g., as sensed, measured, and/or detected by a sensor of the first user-interface assembly 120 of FIG. 1) as being indicative of correlated user requests associated with different operational states (e.g., ignite, high, medium, low, or off) of the first burner 102 of FIG. 1. For example, in response to determining that the control knob of the first user-interface assembly 120 has been positioned at a relative angle of negative one hundred eighty degrees (−180°), the controller 144 may interpret the determined rotational position as a user request that the first burner 102 operate in a "medium" state. To satisfy the user request indicated by the determined rotational position of the control knob of the first user-interface assembly 120, the controller 144 may instruct, command, and/or signal the first burner valve 112 of FIG. 1 to assume a first corresponding target position, such as a partially open (e.g., 50% open) position that facilitates a "medium" flow of gas through the first burner valve 112 and into the first burner 102, thereby effecting the "medium" operational state of the first burner 102.

As another example, in response to determining that the control knob of the first user-interface assembly 120 has been positioned at a relative angle of negative ninety degrees (−90°), the controller 144 may interpret the determined rotational position as a user request that the first burner 102 operate in a "high" state. To satisfy the user request indicated by the determined rotational position of the control knob of the first user-interface assembly 120, the controller 144 may instruct, command, and/or signal the first burner valve 112 of FIG. 1 to assume a second corresponding target position, such as a fully open (e.g., 100% open) position that facilitates a "high" flow of gas through the first burner valve 112 and into the first burner 102, thereby effecting the "high" operational state of the first burner 102. As yet another example, in response to determining that the control knob of the first user-interface assembly 120 has been positioned at a relative angle of zero degrees (0°), the controller 144 may interpret the determined rotational position as a user request that the first burner 102 be placed in an "off" state. To satisfy the user request indicated by the determined rotational position of the control knob of the first user-interface assembly 120, the controller 144 may instruct, command, and/or signal the first burner valve 112 of FIG. 1 to assume a third corresponding target position, such as a fully closed (e.g., 0% open, or 100% closed) position that prevents any flow of gas through the first burner valve 112 and into the first burner 102, thereby effecting the "off" state of the first burner 102.

As yet another example, in response to determining that the control knob of the first user-interface assembly 120 has been pushed and/or pressed inward, the controller 144 may interpret the determined translational position as a user request that the first burner 102 be ignited. To satisfy the user request indicated by the determined translational position of the control knob of the first user-interface assembly 120, the controller 144 may instruct, command, and/or signal the first burner valve 112 of FIG. 1 to assume a fully open (e.g., 100% open) position that facilitates a "high" flow of gas through the first burner valve 112 and into the first burner 102. The controller 144 may further instruct, command, and/or signal the first ignitor 116 of FIG. 1 to ignite the flow of gas emanating from the first burner 102, thereby effecting the "ignited" state of the first burner 102. As yet another example, in response to determining that the control knob of the first user-interface assembly 120 has been pushed and/or pressed inward, the controller 144 may interpret the determined translational position as a user request that all burners (e.g., the first burner 102 and the second burner 104) of the grill 100 be ignited. To satisfy the user request indicated by the determined translational rotational position of the control knob of the first user-interface assembly 120, the controller 144 may instruct, command, and/or signal the first burner valve 112 and the second burner valve 114 of FIG. 1 to respectively assume (e.g., either concurrently, or sequentially) a fully open (e.g., 100% open) position that facilitates a "high" flow of gas through the first burner valve 112 and into the first burner 102, as well as a "high" flow of gas through the second burner valve 114 and into the second burner 104. The controller 144 may further instruct, command, and/or signal the first ignitor 116 and the second ignitor 118 of FIG. 1 to respectively ignite (e.g., either concurrently or sequentially) the flow of gas emanating from the first burner 102 and the flow of gas emanating from the second burner 104, thereby effecting the "ignited" state of both the first burner 102 and the second burner 104.

Correlation data (e.g., a correlation table) establishing and/or defining one or more correlation(s) and/or relationship(s) between one or more position(s) (e.g., one or more rotational and/or translational position(s)) of the control knob of the first user-interface assembly 120 of the grill 100 of FIG. 1 on the one hand, and one or more position(s) (e.g., one or more target position(s)) of the first burner valve 112 of the grill of FIG. 1 on the other hand may be stored in the memory 150 of the grill 100 of FIG. 1. Such correlation data may be accessed from the memory 150 by the controller 144 of the grill 100 of FIG. 1 in the course of the controller 144 determining a target position for the first burner valve 112 (e.g., a position to which the controller 144 is to instruct, command, and/or otherwise cause the first burner valve 112 to move to) based on a detected and/or determined position (e.g., a rotational and/or a translational position) of the control knob of the first user-interface assembly 120 of FIG. 1, as further described below.

As noted above, the grill 100 of FIG. 1 includes a plurality of user-interface assemblies 120, 122, 124. While the above description explains the operation of the grill 100 with respect to the first user-interface assembly 120, other user-interface assemblies, such as user-interface assembly #2 122 and user-interface assembly #n 124 may additionally and/or alternatively be used. Moreover, while in the illustrated example of FIG. 1, three user-interface assemblies are shown, any number of user-interface assemblies may be used. In the illustrated example of FIG. 1, user-interface assembly #1 120 corresponds to and/or controls operation of the burner valve #1 112, burner #1 102, and ignitor #1 116; user-interface assembly #2 122 corresponds to and/or controls operation of the burner valve #2 114, burner #2 104, and ignitor #2 118; and user-interface assembly #n 124 corresponds to and/or controls operation of the burner valve #n 115, burner #n 105, and ignitor #n 119. In this manner, there is a one-to-one correspondence between each user-interface assembly and its corresponding burner valve, burner, and ignitor. However, in some examples, there may be a one-to-many correspondence, where a user-interface assembly may be used to control more than one burner valve, burner, and ignitor.

Figure 6:
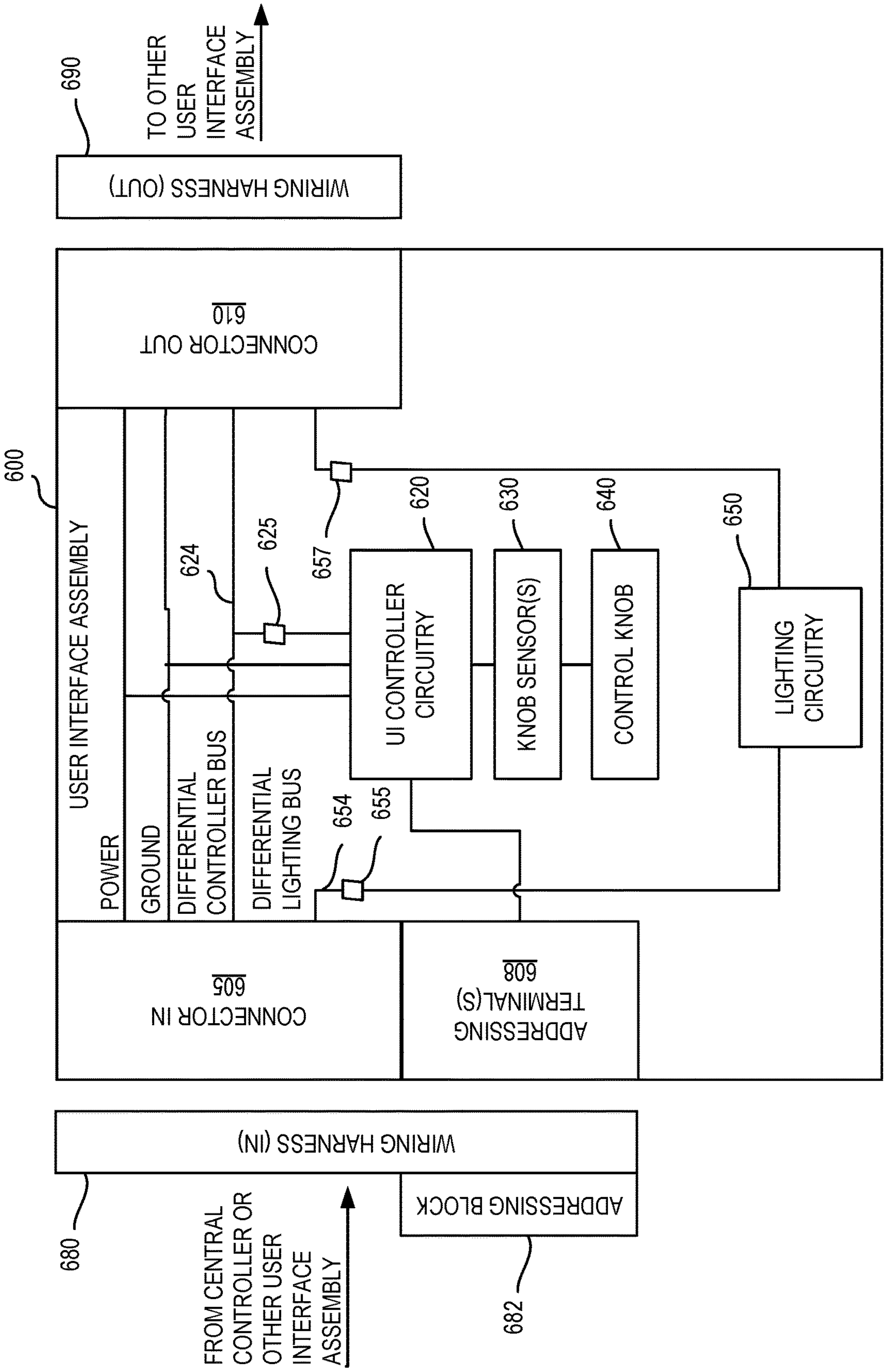
FIG. 6 is a block diagram of an example user-interface assembly that may be used as a component of the example grill of FIG. 1

FIG. 6 is a block diagram of an example implementation of a user-interface assembly, such as one of the user-interface assemblies 120, 122, 124 of FIG. 1. The example user-interface assembly 600 of FIG. 6 includes an input connector 605, addressing terminals 608, an output connector 610, user-interface controller circuitry 620, knob sensor(s) 630, a control knob 640, a lighting circuitry 650, a differential controller bus 623, a differential lighting bus 654, and differential signaling translators 625, 655, 657. The user-interface assembly 600 connects with an input wiring harness 680 which includes an addressing block 682. The user-interface assembly 600 further connects with an output wiring harness 690. In some examples, the user-interface assembly may be implemented as a knob assembly. The term "knob assembly" may be used, for example, because of the connection to a rotary knob-style input device. In contrast, other styles of input devices may additionally or alternatively be used such as, for example, sliders, buttons, etc. Examples disclosed herein are not limited solely to control systems that utilize rotary knob-styled input devices but, instead may be utilized with any type and/or style of input device.

The user-interface controller circuitry 620 of the illustrated example of FIG. 6 communicates via an example differential controller bus 654. As noted above, the differential controller bus 654 is implemented using an inter-integrated circuit protocol. As such, the user-interface controller circuitry 620, when initializing communications via the differential controller bus 654, identifies itself using an address. The address to be used by the user-interface assembly 600 is selected by the addressing block 682, which selectively shorts terminals within the addressing terminals 608. In this manner, different addressing blocks can be used for different user-interface assemblies, resulting in each user-interface assembly communicating using different addresses via the differential controller bus 654.

The user-interface controller circuitry 620 receives data from the knob sensor(s) 630, and provides such information to the controller 144 of FIG. 1 via the differential controller bus 654. In examples disclosed herein, the knob sensor(s) 630 are implemented by one or more of a rotary encoder, a potentiometer, a switch, a button, a plurality of buttons, a slider, etc. The knob sensor(s) 630 enable detection of the position and/or interaction with the control knob 640. In some examples, the knob sensor(s) 630 are, more generically, implemented as sensors that enable detection of user interaction with other types of user interface elements such as, for example, buttons, sliders, etc.

In some examples, the user-interface controller circuitry 620 may additionally or alternatively be in communication with other input and/or output devices. For example, in addition to the knob sensor(s) 630, the user-interface controller circuitry 620 may be in communication with input devices such as, for example, a touchscreen display, an electromechanical input (e.g., an encoder, pushbuttons, etc.) and/or any combination thereof. Moreover, the user-interface controller circuitry 620 may additionally or alternatively be in communication with output devices such as, for example, a display, a speaker, a buzzer, an actuator, a servo, etc.

The example lighting circuitry 650 of the illustrated example of FIG. 6 is implemented as one or more light emitting diodes (LEDs). However, any other lighting circuitry may additionally or alternatively be used. The LEDs of the illustrated example of FIG. 6 are connected in a serial fashion. In this manner, the user-interface assembly 600 receives a control signal via the input connector 605, translates the differential signal into a traditional (e.g., non-differential signal) using the differential signaling translator 655, lights the lighting circuitry 650, converts the output of the lighting circuitry 650 into a differential signal using the differential signaling translator 657, and outputs the differential signal via the output connector 610.

The lighting circuitry 650 of the grill 100 of FIG. 1 can be implemented by any number(s), any type(s), and/or any configuration(s) of lighting circuits(s). The lighting circuitry 650 of FIG. 6 is configured to project light (e.g., emitted from one or more incandescent, halogen, or light-emitting diode (LED) light source(s) of the lighting circuitry 650) toward or away from one or more structure(s) of the grill 100 including, for example, the cookbox 202, the lid 204, the handle 206, the frame 208, the cabinet 210, the control panel 212, the first side table 214, and/or the second side table 216 of the grill 100. In some examples, the lighting circuitry 650 is mechanically coupled to (e.g., fixedly connected to) the grill 100. For example, one or more of the lighting circuits can be mounted to the cookbox 202, the lid 204, the handle 206, the frame 208, the cabinet 210, the control panel 212, the first side table 214, and/or the second side table 216 of the grill 100. In such examples, the lighting circuitry 650 is preferably mounted to a portion of the grill 100 that enables the light source(s) of the lighting circuitry 650 to be easily viewed by a user of the grill 100, such as a front portion of the cookbox 202, a front portion of the lid 204, a front portion of the handle 206, a front portion of the frame 208, a front portion of the cabinet 210, a front portion of the control panel 212, a front portion of the first side table 214, and/or a front portion of the second side table 216 of the grill 100. In some examples, the lighting circuitry 650 can be implemented by and/or as one or more of the output device (s) 138 of the user interface 134 of the grill 100, as further described below.

The lighting circuitry 650 can be implemented as a controllable electric lighting module having one or more light source(s) that is/are configured to transition from an off state (e.g., a non-light-projecting state of the light source(s) of the lighting module) to an on state (e.g., a light-projecting state of the light source(s) of the lighting module), and vice-versa, in response to instructions, commands, and/or signals (e.g., a supply of current) generated by the controller 144 of the grill 100. In some examples, one or more of the light source(s) may be instructed, commanded, and/or signaled (e.g., by the controller 144) to illuminate in a manner that causes the light source(s) to appear as being constantly lit (e.g., in a constant light-projecting state) over a duration of time. In other examples, one or more of the light source(s) may be instructed, commanded, and/or signaled (e.g., by the controller 144) to illuminate in a manner that causes the light source(s) to appear as being periodically lit and/or blinking (e.g., switching up and back between a light-projecting state and a non-light-projecting state) over a duration of time. In still other examples, one or more of the light source(s) of the lighting circuitry 650 may be instructed, commanded, and/or signaled (e.g., by the controller 144) to cease illuminating such that the light source(s) appear as being constantly unlit (e.g., in a constant non-light-projecting state) over a duration of time.

In instances where one or more of the light source(s) of the lighting circuitry 650 is/are implemented as an LED, one or more of such LED(s) can be implemented as multi-color LED that can be instructed, commanded, and/or signaled (e.g., by the controller 144) to illuminate in different colors (e.g., white, red, blue, etc.) of the color spectrum. In some such examples, one or more of the multi-color LED(s) may be instructed, commanded, and/or signaled to illuminate in a first color (e.g., white) to indicate that the grill 100 is powered on, and a second color (e.g., red) to indicate that a control knob (e.g., the control knob of the first user-interface assembly 120) of the grill 100 is in a rotational position that corresponds to a burner valve (e.g., the first burner valve 112) of the grill 100 being in an open position (e.g., a partially-open position or a fully-open position). In some such examples, the intensity of the second color to which the LED(s) is/are illuminated may change in relation to the extent to which the control knob of the grill 100 is rotated, and/or in relation to the extent to which the burner valve of the grill 100 is open. In other such examples, the second color to which the LED(s) is/are illuminated may change to one or more other color(s) (e.g., a third color, a fourth color, etc.) in relation to the extent to which the control knob of the grill 100 is rotated, and/or in relation to the extent to which the burner valve of the grill 100 is open. The aforementioned color schemes are advantageous in that they intuitively informs a user of the grill 100 of the operational status of the burner valve (e.g., the first burner valve 112) and/or the burner (the first burner 102) of the grill 100. In this regard, users of various objects conventionally associate the color red with a warm or hot status of an object, as would exist in a scenario where flames are emanating from a burner of the grill 100.

The example differential signaling translators 625, 655, 657 enable translation between differential signaling (e.g., used when communicating via the harness(es)) and non-differential signaling.

Figure 7:
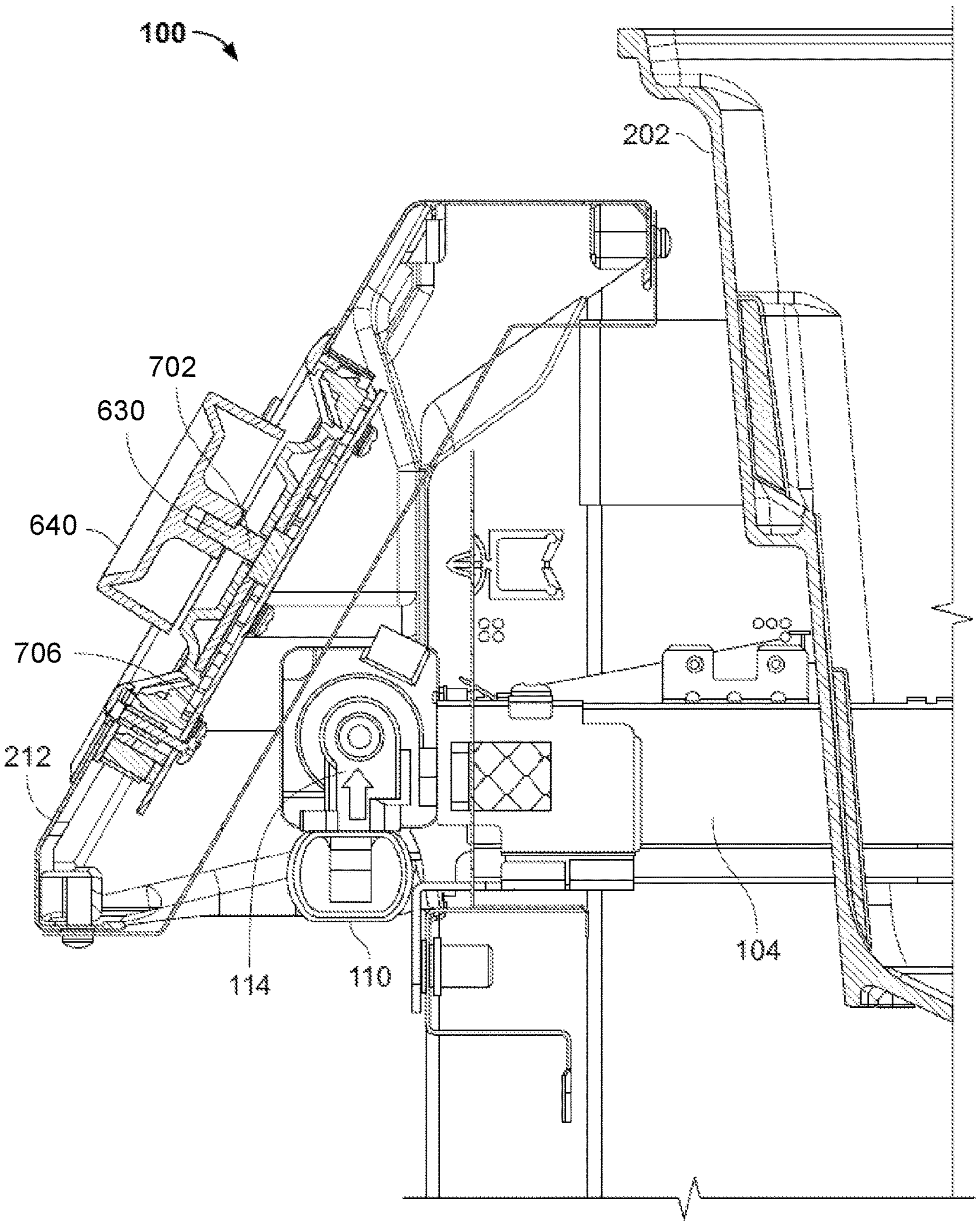
FIG. 7 is a partial cross-sectional view of the implementation of the grill shown in FIGS. 2-4A.

FIG. 7 is a partial cross-sectional view of the implementation of the grill 100 shown in FIGS. 2-4A. As shown in FIG. 7, the knob sensor(s) 630 of the user-interface assembly 600 is implemented as a rotary encoder having an example rotatable portion 702 (e.g., a rotatable shaft) to which the control knob 640 of the user-interface assembly 600 is mechanically coupled. The rotatable portion 702 of the knob sensor(s) 630 can be rotated via user interaction with the control knob 640 (e.g., manual rotation of the control knob 640). In the illustrated example of FIG. 7, the rotatable portion 702 of the knob sensor(s) is mechanically connected to a printed circuit board 706. In some examples, the printed circuit board 706 is populated with the electronic components of the user-interface assembly 600. The knob sensor(s) 630 includes one or more sensor(s) that is/are configured to sense, measure, and/or detect the relative angular position of the control knob 640. Data, information, and/or signals that is/are sensed, measured, and/or detected by the knob sensor(s) 630 can be transmitted directly to the controller 144 of FIG. 1, and/or can be transmitted to and stored in the memory 150 of FIG. 1.

As further shown in FIG. 7, the control knob 640 is not mechanically coupled to the second burner valve 114 of the grill 100. Nor is any portion of the user-interface assembly 600 mechanically coupled to the second burner valve 114 of the grill 100. Instead, a "control-by-wire" architecture exists in relation to the control knob 640 and the burner valve 114.

Returning to the illustrated example of FIG. 1, the temperature sensor 128 of FIG. 1 senses, measures, and/or detects the temperature within the cooking chamber 302 of the grill 100. In some examples, the temperature sensor 128 can be implemented by and/or as a thermocouple coupled to either the cookbox 202 or the lid 204 of the grill 100, and positioned in and/or extending into the cooking chamber 302 of the grill 100. Data, information, and/or signals sensed, measured, and/or detected by the temperature sensor 128 of FIG. 1 can be of any quantity, type, form, and/or format. Data, information, and/or signals sensed, measured, and/or detected by the temperature sensor 128 of FIG. 1 can be transmitted directly to the controller 144 of FIG. 1, and/or can be transmitted to and stored in the memory 150 of FIG. 1.

The flame sensor(s) 130 of the grill 100 of FIG. 1 can be implemented by any number(s), any type(s), and/or any configuration(s) of flame sensor(s). The flame sensor(s) 130 is/are configured to sense, measure, and/or detect the presence and/or the absence of a flame emanating from the first burner 102 and/or the second burner 104 of the grill 100. In some examples, one or more of the flame sensor(s) 130 of the grill 100 can be structured, configured, and/or implemented as one of the various flame sensors described in U.S. patent application Ser. No. 17/144,038, filed on Jan. 7, 2021. The entirety of U.S. patent application Ser. No. 17/144,038 is hereby incorporated by reference herein. Data, information, and/or signals sensed, measured, and/or detected by the flame sensor(s) 130 of FIG. 1 can be of any quantity, type, form, and/or format. In some examples, data, information, and/or signals sensed, measured, and/or detected by the flame sensor(s) 130 of FIG. 1 can be transmitted directly to the controller 144 of FIG. 1, and/or can be transmitted to and stored in the memory 150 of FIG. 1.

Figure 8A:
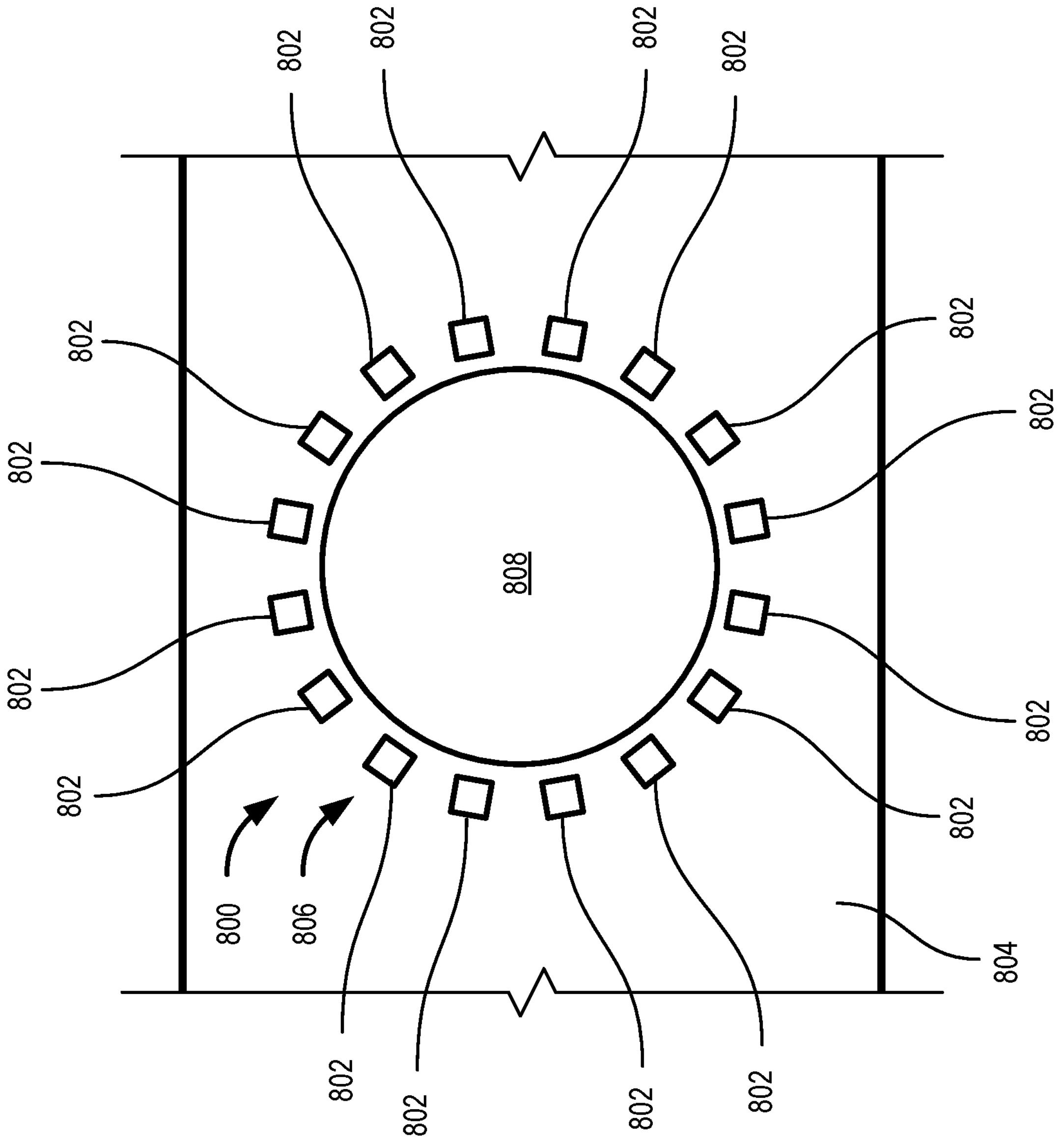
FIG. 8A is a front view of an example lighting module of FIG. 6.
Figure 8B:
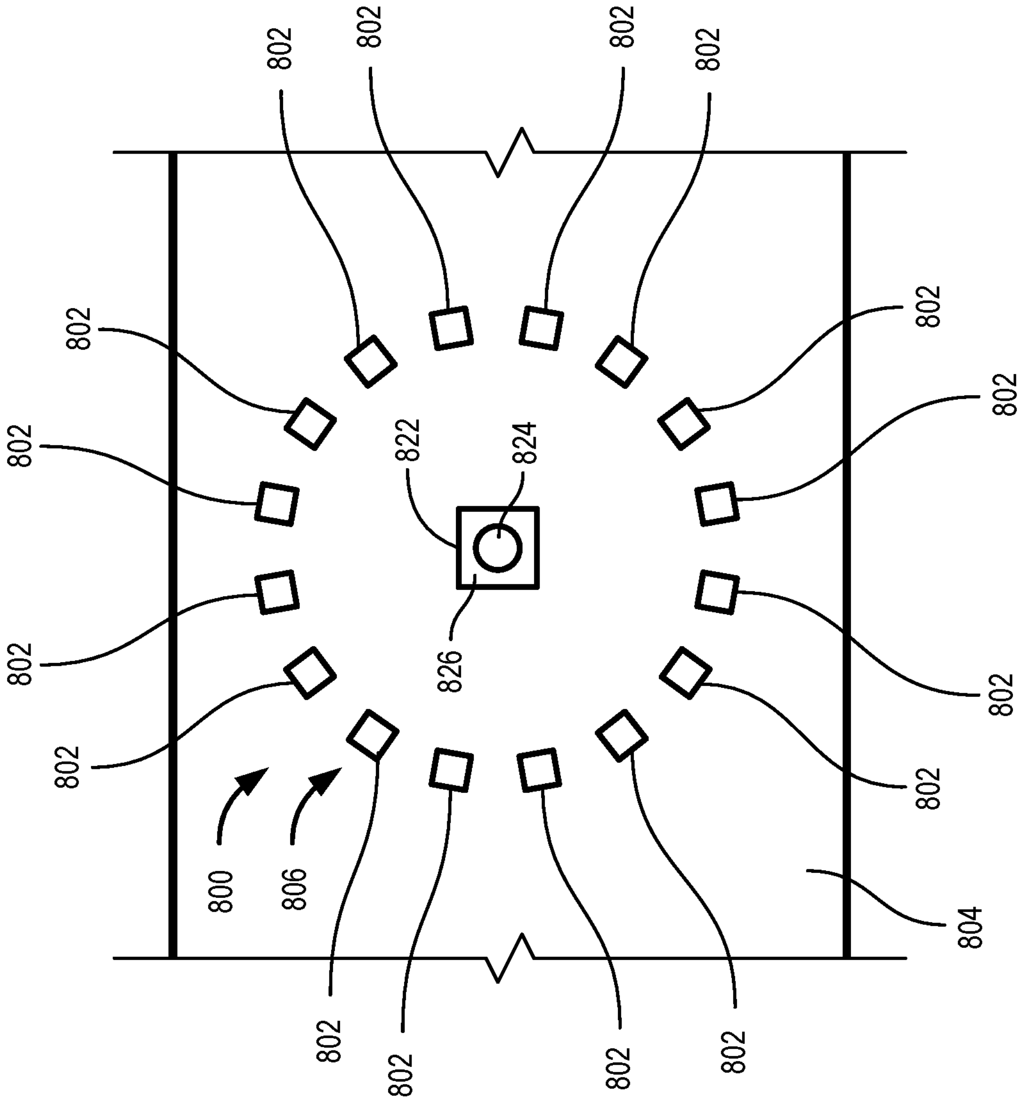
FIG. 8B is a front view of the lighting module shown in FIG. 8A, with the control knob of FIG. 6 removed.
Figure 9:
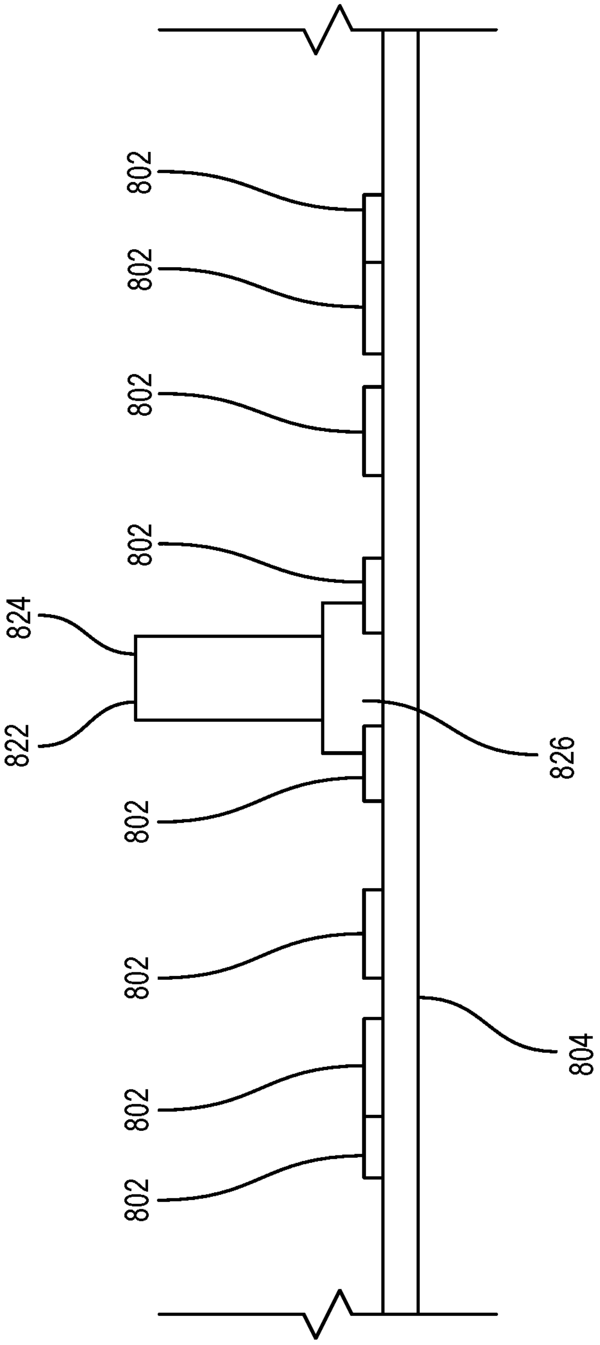
FIG. 9 is a side view of the lighting module shown in FIGS. 8A and 8B, with the control knob of FIG. 6 removed.

FIG. 8A is a front view of an example lighting module 800 that can be implemented by or as the lighting circuitry 650 of FIG. 6. In the illustrated example of FIG. 8A, the lighting module 800 includes a plurality of example LEDs 802 mounted to, positioned on, and/or otherwise located relative to an example printed circuit board 804 of a control panel of a grill (e.g., the control panel 212 of the grill 100 of FIGS. 2-4A and 7). As shown in FIG. 8A, the LEDs 802 are configured as an example ring 806, with the ring 806 being concentrically positioned relative to an example control knob 808 that is also mounted to, positioned on, and/or otherwise located relative to the printed circuit board 804 of the control panel. The control knob 808 of FIG. 8 can be implemented by and or as the control knob 640 of FIG. 6 described above. FIG. 8B is a front view of the lighting module 800 shown in FIG. 8A, with the control knob 808 of FIG. 8A removed. FIG. 9 is a side view of the lighting module 800 shown in FIGS. 8A and 8B, with the control knob 808 of FIG. 8A removed.

As shown in FIGS. 8B and 9, the ring 806 of the LEDs 802 is also concentrically positioned relative to an example rotary encoder 822 having an example rotatable portion 824 (e.g., a rotatable shaft) to which the control knob 808 shown in FIG. 8A is mechanically coupled. The rotatable portion 824 of the rotary encoder 822 can be rotated relative to an example fixed portion 826 of the rotary encoder 822 via user interaction with the control knob 808 (e.g., manual rotation of the control knob 808). The fixed portion 826 of the rotary encoder 822 includes one or more sensor(s) that is/are configured to sense, measure, and/or detect the relative angular position of the rotatable portion 824 and/or the relative angular position of the control knob 808. The rotary encoder 822 of FIGS. 8B and 9 can be implemented by knob sensor(s) of FIG. 6. Data, information, and/or signals that is/are sensed, measured, and/or detected by the sensor(s) of the rotary encoder 802 can accordingly be transmitted directly to the controller 144 of FIG. 1, and/or can be transmitted to and stored in the memory 150 of FIG. 1.

As shown in FIGS. 8B and 9, the fixed portion 826 of the rotary encoder 822 is mounted to, positioned on, and/or otherwise located relative to the printed circuit board 804 of the control panel. In the illustrated example of FIGS. 8A, 8B, and/or 9, the ring 806 of the LEDs 802 circumscribes the rotary encoder 822 and also circumscribes the control knob 808. In other examples (e.g., when one or more portion(s) of the control knob 808 is/are transparent or translucent), the ring 806 of the LEDs 802 may circumscribe the rotary encoder 822, and the control knob 808 may circumscribe the ring 806 of the LEDs 802.

In the illustrated example of FIGS. 8A, 8B, and/or 9, the LEDs 802 of the lighting module 800 can be either individually or collectively controllable to transition from an off state (e.g., a non-light-projecting state) to an on state (e.g., a light-projecting state) and vice-versa, in response to instructions, commands, and/or signals (e.g., a supply of current) generated by the controller 144 of the grill 100. In this regard, the LEDs 802 can be individually or collectively instructed, commanded, and/or signaled (e.g., by the controller 144) to illuminate in a manner that causes one or more of the LEDs 802 to appear as being constantly lit (e.g., in a constant light-projecting state) over a duration of time. The LEDs 802 can alternatively be individually or collectively instructed, commanded, and/or signaled (e.g., by the controller 144) to illuminate in a manner that causes one or more of the LEDs 802 to appear as being periodically lit and/or blinking (e.g., switching up and back between a light-projecting state and a non-light-projecting state) over a duration of time. The LEDs 802 can alternatively be individually or collectively instructed, commanded, and/or signaled (e.g., by the controller 144) to cease illuminating such that one or more of the LEDs 802 appear(s) as being constantly unlit (e.g., in a constant non-light-projecting state) over a duration of time.

In some examples, the LEDs 802 of the lighting module 800 of FIGS. 8A, 8B, and/or 9 are implemented as multi-color LEDs that can be individually or collectively instructed, commanded, and/or signaled (e.g., by the controller 144) to illuminate in different colors (e.g., white, red, blue, etc.) of the color spectrum. In some such examples, one or more of the multi-color LEDs 802 can be individually or collectively instructed, commanded, and/or signaled to illuminate in a first color (e.g., white) to indicate that the grill 100 is powered on, and a second color (e.g., red) to indicate that the control knob 808 is in a rotational position that corresponds to a burner valve (e.g., the first burner valve 112 or the second burner valve 114) of the grill 100 being in an open position (e.g., a partially-open position or a fully-open position). In some such examples, the intensity of the second color to which the LED(s) 802 is/are illuminated may change in relation to the extent to which the control knob 808 is rotated, and/or in relation to the extent to which the burner valve of the grill 100 is open. In other such examples, the second color to which the LED(s) 802 is/are illuminated may change to one or more other color(s) (e.g., a third color, a fourth color, etc.) in relation to the extent to which the control knob 808 is rotated, and/or in relation to the extent to which the burner valve of the grill 100 is open.

In some examples, respective ones of the LEDs 802 of the lighting module 800 of FIGS. 8A, 8B, and/or 9 can be instructed, commanded, and/or signaled (e.g., by the controller 144) to progressively illuminate in a sequential manner (e.g., moving clockwise or counterclockwise) around the circumference of the ring 806 as the control knob 808 is progressively rotated, and/or as the burner valve that is logically connected to the control knob 808 is progressively opened (e.g., moved from a fully-closed position toward a fully-open position). In some such examples, all of the LEDs 802 of the lighting module 800 of FIGS. 8A, 8B, and/or 9 may be in a non-light-projecting state (or, alternatively in a light-projecting state in which the LEDs 802 are illuminated the color white) when the control knob 808 is in a first relative rotational position (e.g., a zero degree position) that corresponds to the burner valve which is logically connected to the control knob 808 being in a fully-closed position (e.g., 0% open position). In such an example, rotation of the control knob 808 in a clockwise direction to a second relative rotational position (e.g., a ninety degree position) may cause the burner valve to be instructed, commanded, and signaled (e.g., by the controller 144) to a first partially-open position (e.g., a 10% open position), and/or may cause several (e.g., between one and four) sequentially-arranged ones of the LEDs 802 to be instructed, commanded, and/or signaled (e.g., by the controller 144) to progressively illuminate (e.g., in a specific color, such as red).

Continuing with such an example, further rotation of the control knob 808 in the clockwise direction to a third relative rotational position (e.g., a one hundred and eighty degree position) may cause the burner valve to be instructed, commanded, and signaled (e.g., by the controller 144) to a second partially-open position (e.g., a 50% open position), and/or may cause several (e.g., between five and eight) sequentially-arranged ones of the LEDs 802 to be instructed, commanded, and/or signaled (e.g., by the controller 144) to progressively illuminate (e.g., in a specific color, such as red). Still further rotation of the control knob 808 in the clockwise direction to a fourth relative rotational position (e.g., a two hundred and seventy degree position) may cause the burner valve to be instructed, commanded, and signaled (e.g., by the controller 144) to a fully-open position (e.g., a 100% open position), and/or may cause several (e.g., between twelve and sixteen) sequentially-arranged ones of the LEDs 802 to be instructed, commanded, and/or signaled (e.g., by the controller 144) to progressively illuminate (e.g., in a specific color, such as red).

Figure 10:
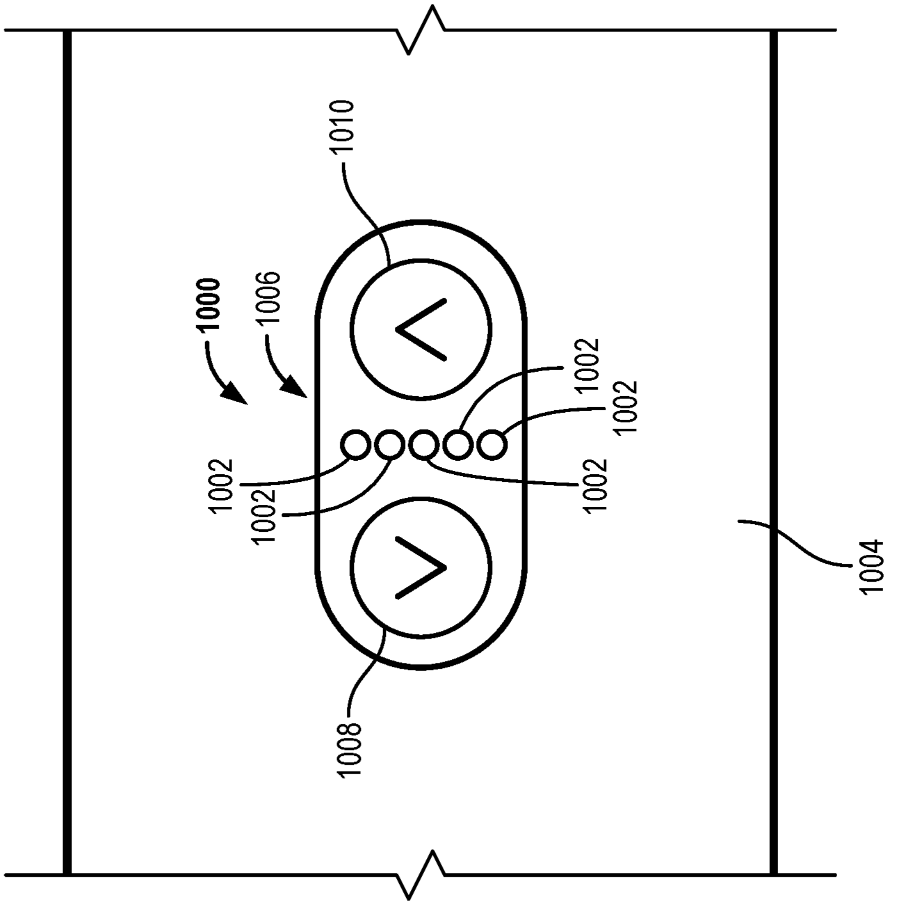
FIG. 10 a front view of another example lighting module that may be implemented as one of the lighting module(s) of FIG. 1.

FIG. 10 a front view of another example control assembly 1000 that may be implemented in place of one of the user-interface assemblies 120 of FIG. 1. In the illustrated example of FIG. 10, the control assembly 1000 includes a plurality of example LEDs 1002 mounted to, positioned on, and/or otherwise located relative to an example control panel 1004. As shown in FIG. 10, the LEDs 1002 are configured as an example linear series 1006 (e.g., a vertically-oriented column, a horizontally-oriented row, etc.), with the linear series 1006 being positioned between a first example control button 1008 and a second example control button 1010 that are also mounted to, positioned on, and/or otherwise located relative to the control panel 1004.

In the illustrated example of FIG. 10, the LEDs 1002 of the control assembly 1000 can be either individually or collectively controllable to transition from an off state (e.g., a non-light-projecting state) to an on state (e.g., a light-projecting state) and vice-versa, in response to instructions, commands, and/or signals (e.g., a supply of current) generated by the controller 144 of the grill 100. In this regard, the LEDs 1002 can be individually or collectively commanded (e.g., by the controller 144) to illuminate in a manner that causes one or more of the LEDs 1002 to appear as being constantly lit (e.g., in a constant light-projecting state) over a duration of time. The LEDs 1002 can alternatively be individually or collectively commanded (e.g., by the controller 144) to illuminate in a manner that causes one or more of the LEDs 1002 to appear as being periodically lit and/or blinking (e.g., switching up and back between a light-projecting state and a non-light-projecting state) over a duration of time. The LEDs 1002 can alternatively be individually or collectively commanded (e.g., by the controller 144) to cease illuminating such that one or more of the LEDs 1002 appear(s) as being constantly unlit (e.g., in a constant non-light-projecting state) over a duration of time.

In some examples, the LEDs 1002 of the control assembly 1000 of FIG. 10 are implemented as multi-color LEDs that can be individually or collectively commanded (e.g., by the controller 144) to illuminate in different colors (e.g., white, red, blue, etc.) of the color spectrum.

Returning to the illustrated example of FIG. 1, the user interface 134 of FIG. 1 includes one or more input device(s) 136 (e.g., buttons, dials, knobs, switches, touchscreens, etc.) and/or one or more output device(s) 138 (e.g., liquid crystal displays, light emitting diodes, speakers, etc.) that enable a user of the grill 100 to interact with the above-described control system of the grill 100. In some examples, the output device(s) 138 of the user interface 134 can include the lighting circuitry 650 described above. The output device(s)

138 of the user interface 134 can be configured to present one or more notification(s) textually (e.g., as a written notification, message, or alert), graphically (e.g., as an illustrated or viewable notification, message, or alert), and/or audibly (e.g., as an audible notification, message, or alert). For example, the output device(s) 138 of the user interface 134 can be configured to textually (e.g., as a written notification, message, or alert), graphically (e.g., as an illustrated or viewable notification, message, or alert), and/or audibly (e.g., as an audible notification, message, or alert) inform the user of the grill 100 that a control knob is in a specific rotational position. As another example, the output device(s) 138 of the user interface 134 can be configured to textually (e.g., as a written notification, message, or alert), graphically (e.g., as an illustrated or viewable notification, message, or alert), and/or audibly (e.g., as an audible notification, message, or alert) inform the user of the grill 100 that a burner valve (e.g., the first burner valve 112 or the second burner valve 114) of the grill 100 is in a specific operational position (e.g., a fully-closed position, a partially-open position, a fully-open position, etc.).

In the illustrated example of FIG. 1, the user interface 134 is operatively coupled to (e.g., in electrical communication with) the controller 144 and/or the memory 150 of the grill 100. In some examples, the user interface 134 is mechanically coupled to (e.g., fixedly connected to) the grill 100. For example, the user interface 134 can be mounted to the cookbox 202, the lid 204, the handle 206, the frame 208, the cabinet 210, the control panel 212, the first side table 214, and/or the second side table 216 of the grill 100. The user interface 134 is preferably mounted to a portion of the grill 100 that is readily accessible to a user of the grill 100, such as a front portion of the cookbox 202, a front portion of the lid 204, a front portion of the handle 206, a front portion of the frame 208, a front portion of the cabinet 210, a front portion of the control panel 212, a front portion of the first side table 214, and/or a front portion of the second side table 216 of the grill 100.

In some examples, respective ones of the input device(s) 136 and/or the output device(s) 138 of the user interface 134 can be mounted to different portions of the grill 100. For example, a first one of the input device(s) 136 can be mounted to a side portion of either the cookbox 202, the lid 204, the handle 206, the frame 208, the cabinet 210, the control panel 212, the first side table 214, or the second side table 216 of the grill 100, and a second one of the input device(s) 136 can be mounted to a front portion of either the cookbox 202, the lid 204, the handle 206, the frame 208, the cabinet 210, the control panel 212, the first side table 214, or the second side table 216 of the grill 100. The architecture and/or operations of the user interface 134 can be distributed among any number of user interfaces respectively having any number of input device(s) 136 and/or output device(s) 138 located at and/or mounted to any portion of the grill 100.

Figure 11:
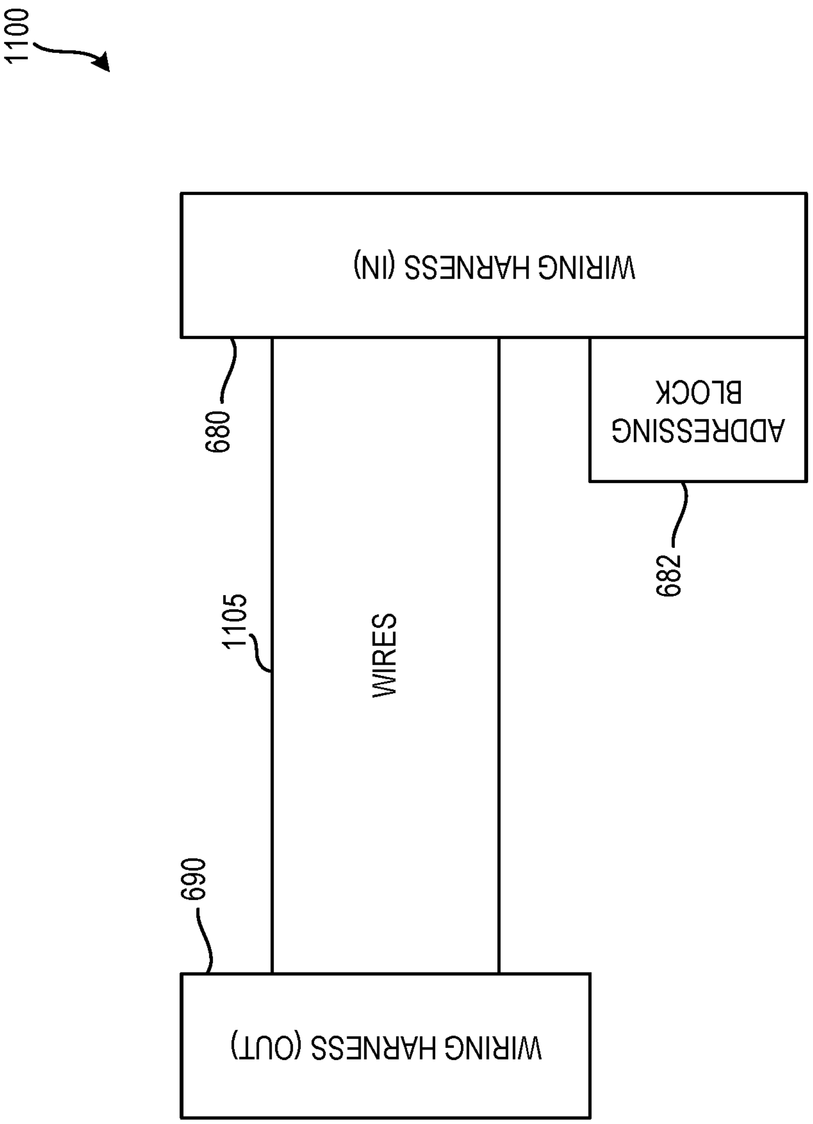
FIG. 11 is diagram of an example connector that may be used to connect either the central controller or one of the user-interface assemblies of FIG. 1 to another one of the user-interface assemblies of FIG. 1.

FIG. 11 is diagram of an example connector 1100 that may be used to connect either the controller 144 or one of the user-interface assemblies 120, 122, 124 of FIG. 1 to another one of the user-interface assemblies 120, 122, 124 of FIG. 1. The example connector 1100 includes the output wiring harness 690 of FIG. 6, wires 1105, the input wiring harness 680 of FIG. 6, and the addressing block 682 of FIG. 6. The output wiring harness 690 is to be connected to the controller 144, or to one of the user-interface assemblies 120, 122, 124. The input wiring harness 680 is to be connected to one of the user-interface assemblies 120, 122, 124. In this manner, the connector 1100 can be used in a daisy chain configuration to connect multiple ones of the user-interface assemblies 120, 122, 124 to the controller 144.

In the illustrated example of FIG. 11, the addressing block 682 is used to specify an address to be used by the user-interface assembly to which it is connected. In this manner, different addressing blocks may be used when connecting to different user-interface assemblies. For example, a first addressing block may identify to the user-interface assembly to which it is connected that the user-interface assembly is a first user-interface assembly in the grill, while a second addressing block may identify to the user-interface assembly to which it is connected that the user-interface assembly is a second user-interface assembly in the grill, etc. Such an approach reduces the need for users and/or installers to select addresses by using jumpers on the user-interface assemblies.

Figure 12:
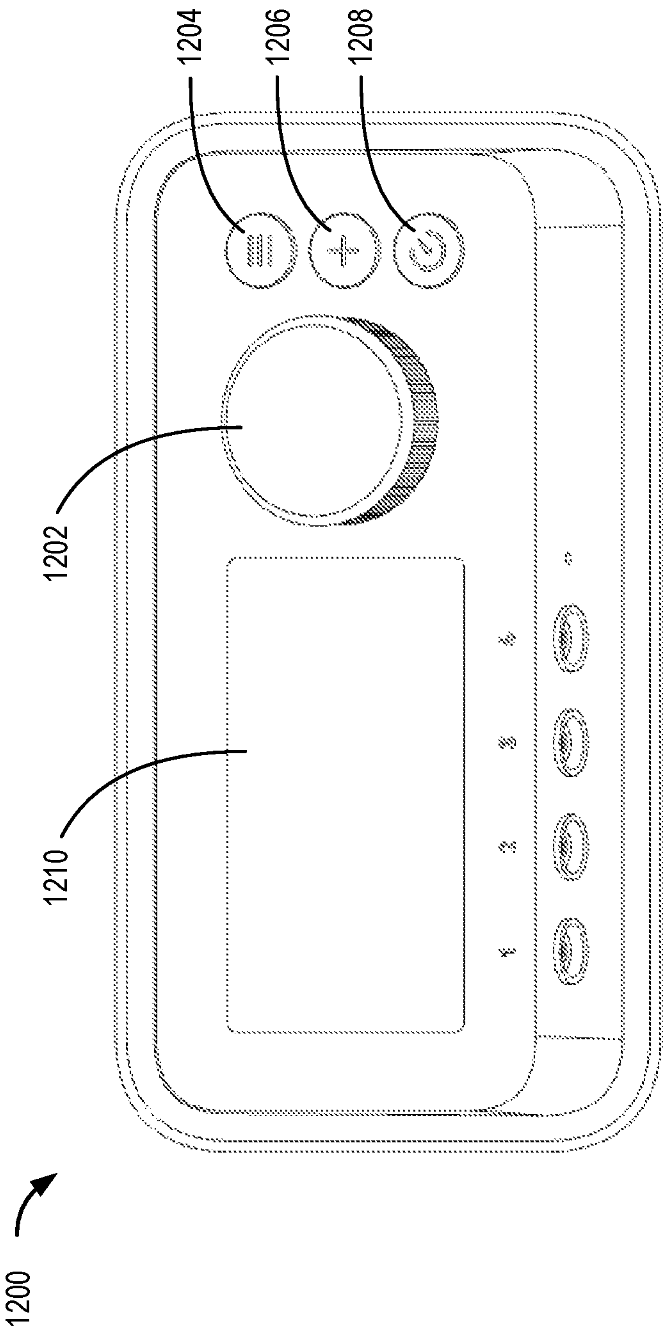
FIG. 12 is a front view of an example user interface that may be implemented as the user interface of FIG. 1.

FIG. 12 a front view of an example user interface 1200 that can be implemented by or as the user interface 134 of the grill 100 of FIG. 1. As shown in FIG. 12, the user interface 1200 includes an example dial 1202, an example first button 1204, an example second button 1206, and an example third button 1208 that can be implemented by or as the input device(s) 136 of the user interface 134 of FIG. 1, and an example display 1210 that can be implemented by or as the output device(s) 138 of the user interface 134 of FIG. 1. In the illustrated example of FIG. 12, the dial 1202 of the user interface 1200 is a selection dial that can be rotated by a user of the grill 100 to adjust temperatures of the grill 100, and/or to navigate through options presented on the display 1210 of the user interface 1200. In addition to being rotatable, the dial 1202 can also be pushed by a user of the grill 100 to make and/or confirm a selection of one of the options presented on the display 1210. The first button 1204 of the user interface 1200 is a menu button that can be pressed by a user of the grill 100 to access a main menu (e.g., a "home" menu) of selectable options, and to cause the main menu to be presented on the display 1210 of the user interface 1200. The second button 1206 of the user interface 1200 is a cook program button that can be pressed by a user of the grill 100 to access a library of selectable cook programs, and to cause steps, instructions, operations, notifications, and/or alerts associated with the selectable cook programs to be presented on the display 1210 of the user interface 1200. The third button 1208 of the user interface 1200 is a timer button that can be pressed by a user of the grill 100 to initiate a timer, and to cause the running time associated with the timer to be presented on the display 1210 of the user interface 1200. The display 1210 of the user interface 1200 is a liquid crystal display configured to present textual and/or graphical information to a user of the grill 100. In some examples, the display 1210 can be implemented as a touch screen, in which case the display 1210 can be implemented not only as one of the output device(s) 138 of the user interface 134, but also as another one of the input device(s) 136 of the user interface 134.

In some examples, one or more notification(s) presented via the display 1210 of the user interface 1210 may inform the user of the grill 100 of a specific rotational position of a control knob of the grill 100. For example, the display 1210 of the user interface 1200 may textually (e.g., as a written notification, message, or alert), graphically (e.g., as an illustrated or viewable notification, message, or alert), and/or audibly (e.g., as an audible notification, message, or alert) inform the user of the grill 100 that a control knob of the grill 100 is/are in a specific rotational position. As another example, the display 1210 of the user interface 1200 may textually (e.g., as a written notification, message, or alert), graphically (e.g., as an illustrated or viewable notification, message, or alert), and/or audibly (e.g., as an audible notification, message, or alert) inform the user of the grill 100 that a burner valve (e.g., the first burner valve 112 or the second burner valve 114) of the grill 100 is in a specific operational position.

The network interface 140 of FIG. 1 includes one or more communication device(s) 142 (e.g., transmitter(s), receiver(s), transceiver(s), modem(s), gateway(s), wireless access point(s), etc.) to facilitate exchange of data with external machines (e.g., computing devices of any kind, including the remote device(s) 152 of FIG. 1) by a wired or wireless communication network. Communications transmitted and/or received via the communication device(s) 142 and/or, more generally, via the network interface 140 can be made over and/or carried by, for example, an Ethernet connection, a digital subscriber line (DSL) connection, a telephone line connection, a coaxial cable system, a satellite system, a wireless system, a cellular telephone system, an optical connection, etc. The network interface 140 enables a user of the grill 100 to remotely interact (e.g., via one or more of the remote device(s) 152) with the above-described control system of the grill 100. In the illustrated example of FIG. 1, the network interface 140 is operatively coupled to (e.g., in electrical communication with) the controller 144 and/or the memory 150 of the grill 100.

The remote device(s) 152 of FIG. 1 can be implemented by any type(s) and/or any number(s) of mobile or stationary computing devices. In this regard, examples of such remote device(s) 152 include a smartphone, a tablet, a laptop, a desktop, a cloud server, a wearable computing device, etc. The remote device(s) 152 of FIG. 1 facilitate a remote (e.g., wired, or wireless) extension of the above-described user interface 134 of the grill 100. In this regard, each remote device 152 includes one or more input device(s) and/or one or more output device(s) that mimic and/or enable a remotely-located version of the above-described functionality of the corresponding input device(s) 136 and/or the corresponding output device(s) 138 of the user interface 134 of the grill 100. Accordingly, one or more notification(s) transmitted from the grill 100 (e.g., via the communication device(s) 142 of the network interface 140 of the grill 100) can be presented via the output device(s) of the remote device(s) 152 much in the same way that such notification(s) would be presented via the output device(s) 138 of the user interface 134 of the grill 100.

The controller 144 of FIG. 1 manages and/or controls the control system of the grill 100 and/or the components thereof. In the illustrated example of FIG. 1, the controller 144 is operatively coupled to (e.g., in electrical communication with) the fuel source valve 108, the first burner valve 112, the second burner valve 114, the first ignitor 116, the second ignitor 118, the user-interface assemblies 120, 122, 124, the temperature sensor 128, the flame sensor(s) 130, the user interface 134 (e.g., including the input device(s) 136 and the output device(s) 138), the network interface 140 (e.g., including the communication device(s) 142), and/or the memory 150 of the grill 100 of FIG. 1. The controller 144 of FIG. 1 is also operatively coupled to (e.g., in wired or wireless electrical communication with) the remote device(s) 152 of FIG. 1 via the network interface 140 (e.g., including the communication device(s) 142) of the grill 100 of FIG. 1. In the illustrated example of FIG. 1, the controller 144 includes the control circuitry 146 and the detection circuitry 148 of FIG. 1, each of which is discussed in further detail herein. The control circuitry 146, the detection circuitry 148, and/or, more generally, the controller 144 of FIG. 1 can individually and/or collectively be implemented by any type(s) and/or any number(s) of semiconductor device(s) (e.g., processor(s), microprocessor(s), microcontroller(s), etc.) and/or circuit(s).

In the illustrated example of FIG. 1, the controller 144 is graphically represented as a single, discrete structure that manages and/or controls the operation(s) of various components of the control system of the grill 100. It is to be understood, however, that in other examples, the architecture and/or operations of the controller 144 can be distributed among any number of controllers, with each separate controller having a dedicated subset of one or more operation(s) described herein. As but one example, the controller 144 of FIG. 1 can be separated into two distinct controllers, whereby a first one of the two controllers includes the control circuitry 146 of the controller 144, and a second one of the two controllers includes the detection circuitry 148 of the controller 144. In some examples, the grill 100 can further include separate, distinct controllers for one or more of the fuel source valve 108, the first burner valve 112, the second burner valve 114, the first ignitor 116, the second ignitor 118, the user-interface assemblies 120, 122, 124, the temperature sensor 128, the flame sensor(s) 130, the user interface 134 (e.g., including the input device(s) 136 and the output device(s) 138), the network interface 140 (e.g., including the communication device(s) 142), and/or the memory 150 of the grill 100 of FIG. 1.

The controller 144 of FIG. 1 manages and/or controls the implementation and/or execution of one or more process(es), protocol(s), program(s), sequence(s), and/or method(s) associated with controlling the flow of gas through the first burner valve 112 and/or the second burner valve 114 of the grill 100 of FIG. 1 based on position data detected via the user-interface assemblies 120, 122, 124 of the grill 100 of FIG. 1. In some examples, the controller 144 of FIG. 1 additionally or alternatively manages and/or controls the implementation and/or execution of one or more process(es), protocol(s), program(s), sequence(s), and/or method(s) associated with causing the lighting circuitry 650 of FIG. 6 to present one or more notification(s) indicating the rotational position(s) of the control knob 640 of FIG. 6, and/or to present one or more notification(s) indicating the target position(s) of the first burner valve 112 and/or the second burner valve 114 of the grill 100 of FIG. 1. In some examples, the controller 144 of FIG. 1 additionally or alternatively manages and/or controls the implementation and/or execution of one or more process(es), protocol(s), program(s), sequence(s), and/or method(s) associated with causing one or more of the output device(s) 138 of the user interface 134 of the grill 100 of FIG. 1 to present one or more notification(s) indicating the rotational position(s) of the control knob of the first user-interface assembly 120 and/or the control knob of the second user-interface assembly 122 of the grill 100 of FIG. 1, and/or to present one or more notification(s) indicating the target position(s) of the first burner valve 112 and/or the second burner valve 114 of the grill 100 of FIG. 1. In some examples, the controller 144 of FIG. 1 additionally or alternatively manages and/or controls the implementation and/or execution of one or more process(es), protocol(s), program(s), sequence(s), and/or method(s) associated with causing one or more notification(s) indicating the rotational position(s) of the control knob of the first user-interface assembly 120 and/or the control knob of the second user-interface assembly 122 of the grill 100 of FIG. 1, and/or one or more notification(s) indicating the target position(s) of the first burner valve 112 and/or the second burner valve 114 of the grill 100 of FIG. 1, to be presented at one or more of the remote device(s) 152 of FIG. 1 that is/are in electrical communication with the grill 100 of FIG. 1.

The control circuitry 146 of the controller 144 of FIG. 1 manages and/or controls one or more operation(s) of one or more controllable component(s) of the grill 100 that is/are operatively coupled to (e.g., in electrical communication with) the controller 144 of the grill 100. For example, the control circuitry 146 may include valve control circuitry configured to instruct, command, signal, and/or otherwise cause the fuel source valve 108, the first burner valve 112, and/or the second burner valve 114 of the grill 100 to open (e.g., fully open), to close (e.g., fully close), or to otherwise change position. The control circuitry 146 may additionally or alternatively include ignitor control circuitry configured to instruct, command, signal, and/or otherwise cause the first ignitor 116 and/or the second ignitor 118 of the grill 100 to ignite corresponding ones of the first burner 102 and/or the second burner 104 of the grill 100. The control circuitry 146 may additionally or alternatively include lighting control circuitry configured to instruct, command, signal, and/or otherwise cause one or more light source(s) of the lighting circuitry 650 of FIG. 6 to transition (e.g., once, or repeatedly) from an off state (e.g., a non-light-projecting state) to an on state (e.g., a light-projecting state), or vice-versa. In some examples, the transitioning of the one or more light source(s) of the lighting circuitry 650 of FIG. 6 from the off state to the on state, or vice-versa, effects the presentation of one or more notification(s) (e.g., one or more visible message(s) or alert(s)).

The control circuitry 146 may additionally or alternatively include user interface control circuitry configured to instruct, command, signal, and/or otherwise cause one or more of the output device(s) 138 of the user interface 134 of the grill 100 to textually, graphically, or audibly present data and/or information, which may include one or more notification(s) (e.g., one or more visible, audible, and/or tactile message(s) or alert(s)). The control circuitry 146 may additionally or alternatively include network interface control circuitry configured to instruct, command, signal, and/or otherwise cause one or more of the communication device(s) 142 of the network interface 140 of the grill 100 to transmit data and/or information, which may include one or more notification(s) (e.g., one or more visible, audible, and/or tactile message(s) or alert(s)) to one or more of the remote device(s) 152 of FIG. 1.

The detection circuitry 148 of the controller 144 of FIG. 1 detects and/or determines one or more state(s), condition(s), operation(s), and/or event(s) associated with the grill 100 based on data, information, and/or signals received from one or more component(s) of the grill 100 that is/are operatively coupled to (e.g., in wired or wireless electrical communication with) the controller 144 of the grill 100. For example, the detection circuitry 148 may include valve detection circuitry configured to detect and/or determine a relative position of the fuel source valve 108, the first burner valve 112, and/or the second burner valve 114 of the grill 100 based on one or more instruction(s), command(s), and/or signal(s) generated at the control circuitry 146 of the controller 144 and/or transmitted to the fuel source valve 108, the first burner valve 112, and/or the second burner valve 114.

The detection circuitry 148 may additionally or alternatively include encoder detection circuitry configured to detect and/or determine a relative position (e.g., a relative rotational position) of one or more control knob(s) associated with corresponding ones of the user-interface assemblies 120, 122, 124. The detection circuitry 148 may additionally or alternatively include temperature detection circuitry configured to detect and/or determine one or more temperature state(s), condition(s), operation(s), and/or event(s) associated with the grill 100 (e.g., that a temperature of the cooking chamber 302 of the grill 100 is either above or below a predetermined temperature threshold) based on data, information, and/or signals received from the temperature sensor 128 of the grill 100. The detection circuitry 148 may additionally or alternatively include flame detection circuitry configured to detect and/or determine the presence or the absence of a flame at the first burner 102 and/or the second burner 104 of the grill 100 based on data, information, and/or signals received from one or more of the flame sensor(s) 130 of the grill 100.

The detection circuitry 148 may additionally or alternatively include user interface detection circuitry configured to detect and/or determine one or more user interface state(s), condition(s), operation(s), and/or event(s) associated with the grill 100 (e.g., that a user has interacted with one or more of the input device(s) 136 of the user interface 134, that a user has failed to interact with one or more of the input device(s) 136 of the user interface 134, etc.) based on data, information, and/or signals received from the user interface 134 of the grill 100. The detection circuitry 148 may additionally or alternatively include network interface detection circuitry configured to detect and/or determine one or more network interface state(s), condition(s), operation(s), and/or event(s) associated with the grill 100 (e.g., that one or more of the communication device(s) 142 of the network interface 140 has received data, information, and/or signals indicating that a user has interacted with one or more input device(s) of one or more of the remote device(s) 152, that one or more of the communication device(s) 142 of the network interface 140 has failed to receive data, information, and/or signals indicating that a user has interacted with one or more input device(s) of one or more of the remote device(s) 152, etc.) based on data, information, and/or signals received from the network interface 140 of the grill 100.

In some examples, the controller 144 of the grill 100 of FIG. 1 is configured to implement a gas flow control process. In some examples, the detection circuitry 148 of the controller 144 of FIG. 1 is configured to determine a rotational position of a control knob (e.g., a control knob of the first user-interface assembly 120 of FIG. 1) of the grill 100 of FIG. 1 based on position data sensed, measured, and/or detected (e.g., continuously, or periodically) via a sensor of a corresponding one of the user-interface assemblies 120, 122, 124 to which the control knob is mechanically coupled. In some examples, the detection circuitry 148 of the controller 144 is further configured to determine a target position of a burner valve (e.g., the first burner valve 112 or the second burner valve 114 of FIG. 1) of the grill 100 based on the rotational position of the control knob of the grill 100. For example, the detection circuitry 148 of the controller 144 may be configured to determine the target position of the burner valve of the grill 100 by accessing a correlation table (e.g., as may be stored in the memory 150 of the grill 100) that establishes and/or defines one or more correlation(s) and/or relationship(s) between one or more position(s) (e.g., one or more rotational position(s)) of the rotary encoder and/or the control knob of the grill 100 of FIG. 1 on the one hand, and one or more position(s) (e.g., one or more target position(s)) of the burner valve of the grill 100 of FIG. 1 on the other hand (e.g., the target position of the burner valve is Y percent open when the relative rotational position of the control knob is X degrees). In some examples, the control circuitry 146 of the controller 144 of FIG. 1 is configured to instruct, command, signal, and/or otherwise cause the burner valve (e.g., the first burner valve 112 or the second burner valve 114 of FIG. 1) of the grill 100 of FIG. 1 to move to the target position of the burner valve.

In some examples, the controller 144 of the grill 100 of FIG. 1 is configured to implement a control knob position notification process. In some examples, the detection circuitry 148 of the controller 144 of FIG. 1 is configured to determine a rotational position of a control knob of the grill 100 of FIG. 1 based on position data sensed, measured, and/or detected (e.g., continuously, or periodically) via communicating with the user-interface assembly(ies) of the grill 100. In some examples, the control circuitry 146 of the controller 144 of FIG. 1 is configured to generate one or more notification(s) (e.g., visible, audible, and/or tactile message(s) or alert(s)) indicating the rotational position of the control knob of the grill 100 of FIG. 1.

In some examples, the control circuitry 146 of the controller 144 of FIG. 1 is configured to instruct, command, signal, and/or otherwise cause the notification(s) indicating the rotational position of the control knob of the grill 100 of FIG. 1 to be presented locally and/or remotely. For example, the control circuitry 146 may be configured to instruct, command, signal, and/or otherwise cause the lighting circuitry 650 of FIG. 6 to locally present one or more of the notification(s) indicating the rotational position of the control knob of the grill 100. The control circuitry 146 may additionally or alternatively be configured to instruct, command, signal, and/or otherwise cause the user interface 134 of the grill 100 of FIG. 1 to locally present (e.g., via one or more of the output device(s) 138 of the user interface 134) one or more of the notification(s) indicating the rotational position of the control knob of the grill 100. The control circuitry 146 may additionally or alternatively be configured to instruct, command, signal, and/or otherwise cause the network interface 140 of the grill 100 of FIG. 1 to transmit (e.g., via one or more of the communication device(s) 142 of the network interface 140) one or more of the notification(s) indicating the rotational position of the control knob of the grill 100 to one or more of the remote device(s) 152 of FIG. 1 for remote presentation via one or more of the output device(s) of the remote device(s) 152. In some examples, one or more of the notification(s) indicating the rotational position of the control knob of the grill 100 may be presented for a predetermined duration (e.g., a predetermined presentation duration, as may be stored in the memory 150 of the grill 100). In other examples, one or more of the notification(s) indicating the rotational position of the control knob of the grill 100 may be presented until a countering event (e.g., determining that the rotational position of the control knob of the grill 100 has changed, receiving a request, command, and/or instruction to terminate the presentation of the notification(s), etc.) occurs.

In some examples, the controller 144 of the grill 100 of FIG. 1 is configured to implement a burner valve position notification process. In some examples, the detection circuitry 148 of the controller 144 of FIG. 1 is configured to determine a position (e.g., a current operational position) of a burner valve (e.g., the first burner valve 112 or the second burner valve 114 of FIG. 1) of the grill 100 of FIG. 1. For example, the detection circuitry 148 may be configured to determine the position of the burner valve of the grill 100 based on one or more instruction(s), command(s), and/or signal(s) previously generated at the control circuitry 146 of the controller 144 and/or previously transmitted to the burner valve of the grill 100. The control circuitry 146 of the controller 144 of FIG. 1 is configured to generate one or more notification(s) (e.g., visible, audible, and/or tactile message(s) or alert(s)) indicating the position of the burner valve of the grill 100 of FIG. 1.

In some examples, the control circuitry 146 of the controller 144 of FIG. 1 is configured to instruct, command, signal, and/or otherwise cause the notification(s) indicating the position of the burner valve of the grill 100 of FIG. 1 to be presented locally and/or remotely. For example, the control circuitry 146 may be configured to instruct, command, signal, and/or otherwise cause the lighting circuitry 650 of FIG. 6 to locally present one or more of the notification(s) indicating the position of the burner valve of the grill 100. The control circuitry 146 may additionally or alternatively be configured to instruct, command, signal, and/or otherwise cause the user interface 134 of the grill 100 of FIG. 1 to locally present (e.g., via one or more of the output device(s) 138 of the user interface 134) one or more of the notification(s) indicating the position of the burner valve of the grill 100. The control circuitry 146 may additionally or alternatively be configured to instruct, command, signal, and/or otherwise cause the network interface 140 of the grill 100 of FIG. 1 to transmit (e.g., via one or more of the communication device(s) 142 of the network interface 140) one or more of the notification(s) indicating the position of the burner valve of the grill 100 to one or more of the remote device(s) 152 of FIG. 1 for remote presentation via one or more of the output device(s) of the remote device(s) 152. In some examples, one or more of the notification(s) indicating the position of the burner valve of the grill 100 may be presented for a predetermined duration (e.g., a predetermined presentation duration, as may be stored in the memory 150 of the grill 100). In other examples, one or more of the notification(s) indicating the position of the burner valve of the grill 100 may be presented until a countering event (e.g., determining that the position of the burner valve of the grill 100 has changed, receiving a request, command, and/or instruction to terminate the presentation of the notification(s), etc.) occurs.

The memory 150 of FIG. 1 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 150 of FIG. 1 can be stored in any file and/or data structure format, organization scheme, and/or arrangement.

The memory 150 stores data sensed, measured, detected, generated, accessed, input, output, transmitted, and/or received by, to, and/or from the fuel source valve 108, the first burner valve 112, the second burner valve 114, the first ignitor 116, the second ignitor 118, the user-interface assemblies 120, 122, 124, the temperature sensor 128, the flame sensor(s) 130, the user interface 134 (e.g., including the input device(s) 136 and the output device(s) 138), the network interface 140 (e.g., including the communication device(s) 142), the controller 144 (e.g., including the control circuitry 146 and the detection circuitry 148), the remote device(s) 152, and/or, more generally, the control system of the grill 100 of FIG. 1. The memory 150 also stores instructions (e.g., machine-readable instructions) and associated data (e.g., correlation data including, for example, one or more correlation table(s), etc.) corresponding to the processes, protocols, programs, sequences, and/or methods described below in connection with FIGS. 12-14. The memory 150 of FIG. 1 is accessible to one or more of the fuel source valve 108, the first burner valve 112, the second burner valve 114, the first ignitor 116, the second ignitor 118, the user-interface assemblies 120, 122, 124, the temperature sensor 128, the flame sensor(s) 130, the user interface 134 (e.g., including the input device(s) 136 and the output device(s) 138), the network interface 140 (e.g., including the communication device(s) 142), the controller 144 (e.g., including the control circuitry 146 and the detection circuitry 148), the remote device(s) 152, and/or, more generally, the control system of the grill 100 of FIG. 1.

While an example manner of implementing the control system of the grill 100 is illustrated in FIG. 1, one or more of the elements, processes, and/or devices illustrated in FIG. 1 may be combined, divided, re-arranged, omitted, eliminated, and/or implemented in any other way. Further, the example fuel source valve 108, the example first burner valve 112, the example second burner valve 114, the example first ignitor 116, the example second ignitor 118, the example user-interface assemblies 120, 122, 124, the example temperature sensor 128, the example flame sensor(s) 130, the example user interface 134 (e.g., including the example input device(s) 136 and the example output device(s) 138), the example network interface 140 (e.g., including the example communication device(s) 142), the example controller 144 (e.g., including the example control circuitry 146 and the example detection circuitry 148), the example memory 150, and/or, more generally, the control system of the grill 100 of FIG. 1, may be implemented by hardware alone or by hardware in combination with software and/or firmware. Thus, for example, any of the example fuel source valve 108, the example first burner valve 112, the example second burner valve 114, the example first ignitor 116, the example second ignitor 118, the example user-interface assemblies 120, 122, 124, the example temperature sensor 128, the example flame sensor(s) 130, the example user interface 134 (e.g., including the example input device(s) 136 and the example output device(s) 138), the example network interface 140 (e.g., including the example communication device(s) 142), the example controller 144 (e.g., including the example control circuitry 146 and the example detection circuitry 148), the example memory 150, and/or, more generally, the control system of the grill 100 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example control system of the grill of FIG. 1 may include one or more elements, processes, and/or devices in addition to, or instead of, those illustrated in FIG. 1, and/or may include more than one of any or all of the illustrated elements, processes, and devices.

Figure 13:
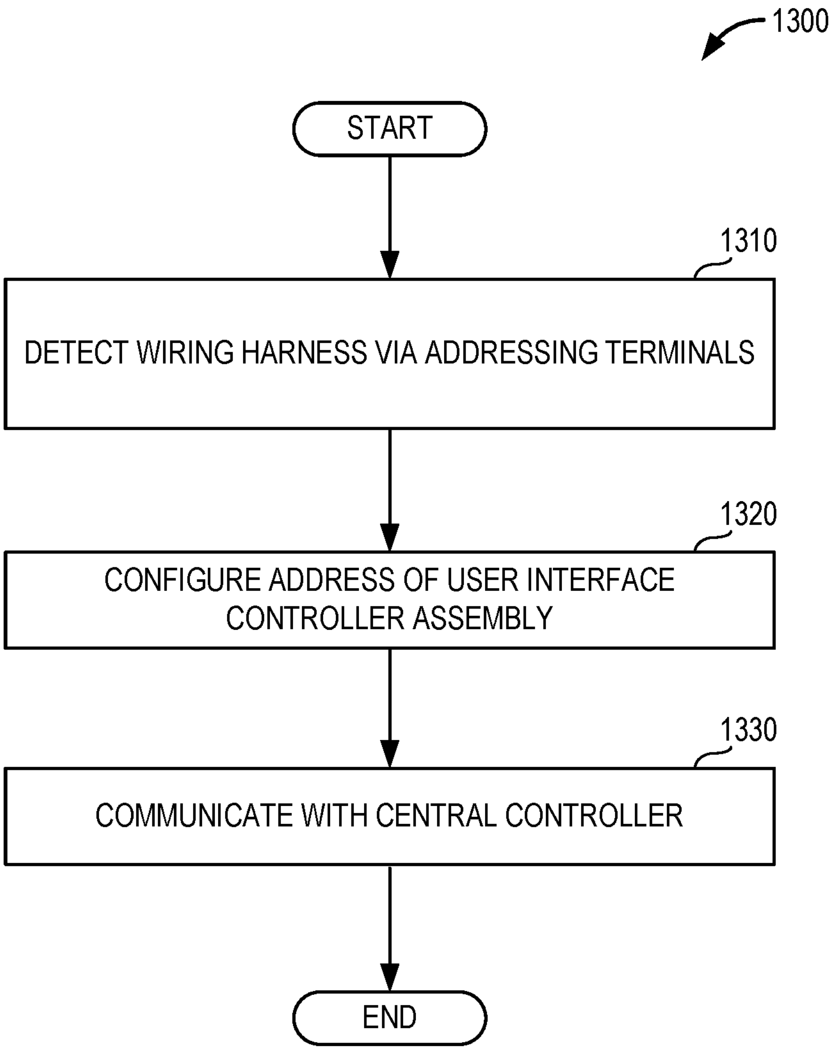
FIG. 13 is a flowchart representative of example machine-readable instructions and/or example operations that may be executed by the user-interface controller circuitry of FIG. 6 to implement a user-interface assembly initialization procedure.
Figure 14:
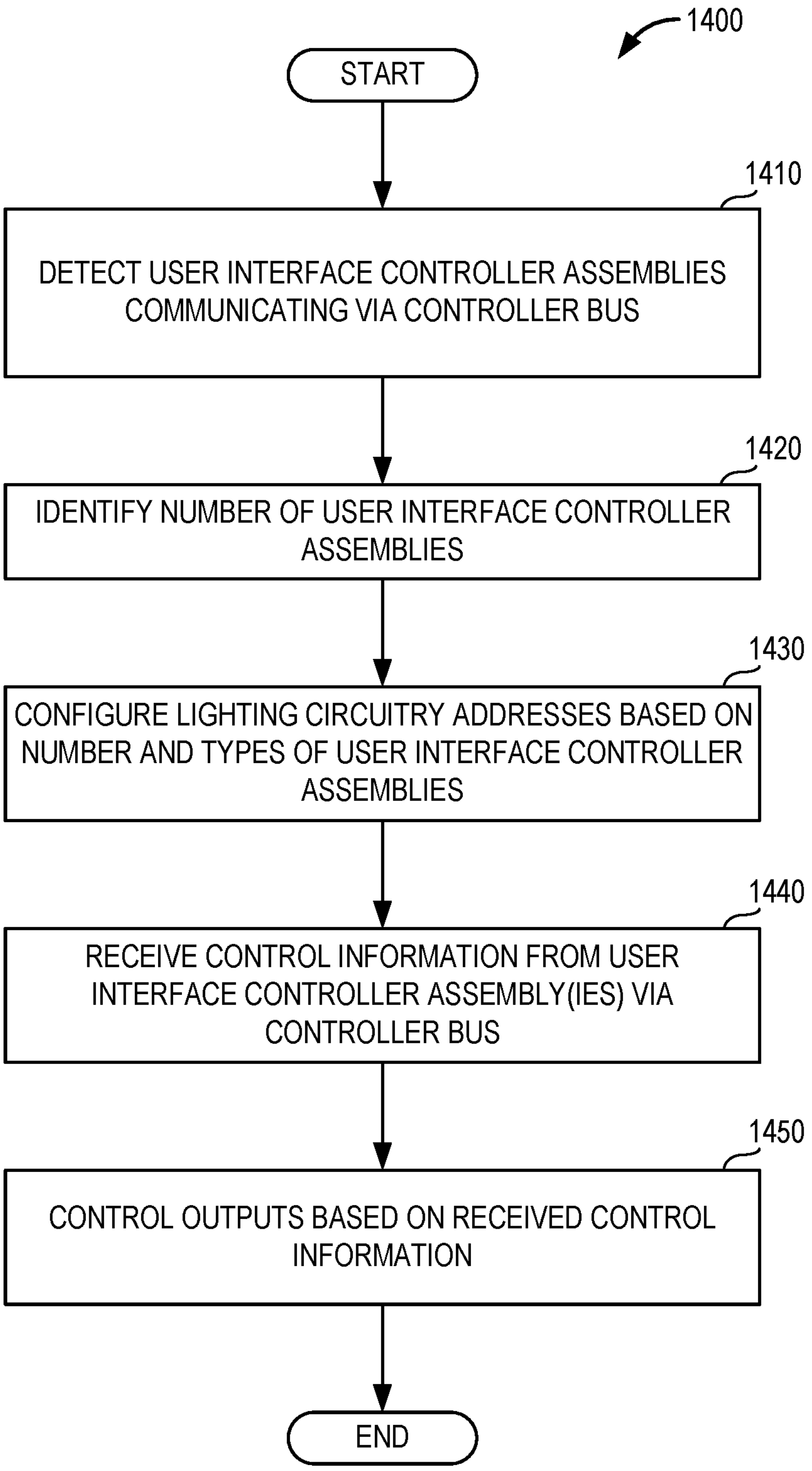
FIG. 14 is a flowchart representative of example machine-readable instructions and/or example operations that may be executed by the control circuitry of FIG. 1 to configure a grill based on information received from a connected user-interface assembly.

Flowcharts representing example hardware logic circuitry, machine-readable instructions, hardware implemented state machines, and/or any combination thereof for implementing the grill 100 of FIG. 1 are shown in FIGS. 13-14. The machine-readable instructions may be one or more executable program(s) or portion(s) thereof for execution by processor circuitry, such as the processor circuitry 1502 shown in the example processor platform 1500 discussed below in connection with FIG. 15 and/or the example processor circuitry discussed below in connection with FIGS. 16 and/or 17. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program(s) and/or the portion(s) thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although example programs are described with reference to the flowcharts illustrated in FIGS. 13-14, many other methods of implementing the example grill 100 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine-executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or any other machine. For example, the machine-readable instructions may be stored in multiple parts, which are individually compressed, encrypted, and/or stored on separate computing devices, wherein the parts when decrypted, decompressed, and/or combined form a set of machine-executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or any other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 13-14 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable medium" and "non-transitory computer-readable storage medium" are expressly defined to include any type of computer-readable storage device and/or storage disk and to exclude propagating signals and to exclude transmission media.

The terms "including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

FIG. 13 is a flowchart representative of example machine-readable instructions and/or example operations 1300 that may be executed by processor circuitry to implement a connection initialization process of the user-interface assembly 120 of FIG. 1. The machine-readable instructions and/or operations 1300 of FIG. 13 begin at block 1310 when the user-interface controller circuitry 620 detects a wiring harness connected via the addressing terminals. (Block 1310). The addressing terminals are, in turn, connected to the addressing block, which selects an identifier to be used by the user-interface controller circuitry 620 when communicating with the controller 144. The user-interface controller circuitry 620 configures an address based on the detected addressing block. (Block 1320). Using the configured address, the user-interface controller circuitry 620 then enables communication with the controller 144. (Block 1330). It should be understood that, when different addressing blocks are used for different user-interface assemblies, such various user-interface assemblies will communicate with the controller 144 using different addresses.

FIG. 14 is a flowchart representative of example machine-readable instructions and/or example operations 1400 that may be executed by processor circuitry to communicate with one or more user-interface assemblies communicating via a controller bus and/or a lighting bus. The machine-readable instructions and/or operations 1400 of FIG. 14 begin at block 1410 when the controller 144 detects one or more user-interface assemblies communicating via the controller bus. (Block 1410). The controller 144 identifies a number of user-interface assemblies communicating via the controller bus. (Block 1420). In examples disclosed herein, the controller detect the number of user-interface assemblies based on the number of unique user-interface assembly addresses. Using the number of user-interface assembly addresses and, in some examples, statistics about the connected user-interface assemblies provided via the controller bus, the example controller 144 configures addresses used by the lighting circuitry(ies) of the connected user-interface assemblies. (Block 1430). In examples disclosed herein, because the lighting bus is implemented in a serial fashion, the LEDs of lighting circuitry within a first user-interface assembly are addressed lower than addresses of LEDs of lighting circuitry within a second user-interface assembly.

The controller 144 receives control information from the user-interface assembly(ies) via the controller bus. (Block 1440). Such control information may include, for example rotation positions of the knobs, whether the knob is depressed (e.g., to initiate ignition of a corresponding burner), etc. Based on the received control information, the example controller 144 controls operations of the grill 100 including, for example, setting a position of a gas valve, enabling an igniter, controlling lighting circuitry(ies) of the user-interface assemblies, communicating with a remote device, etc. (Block 1450).

Figure 15:
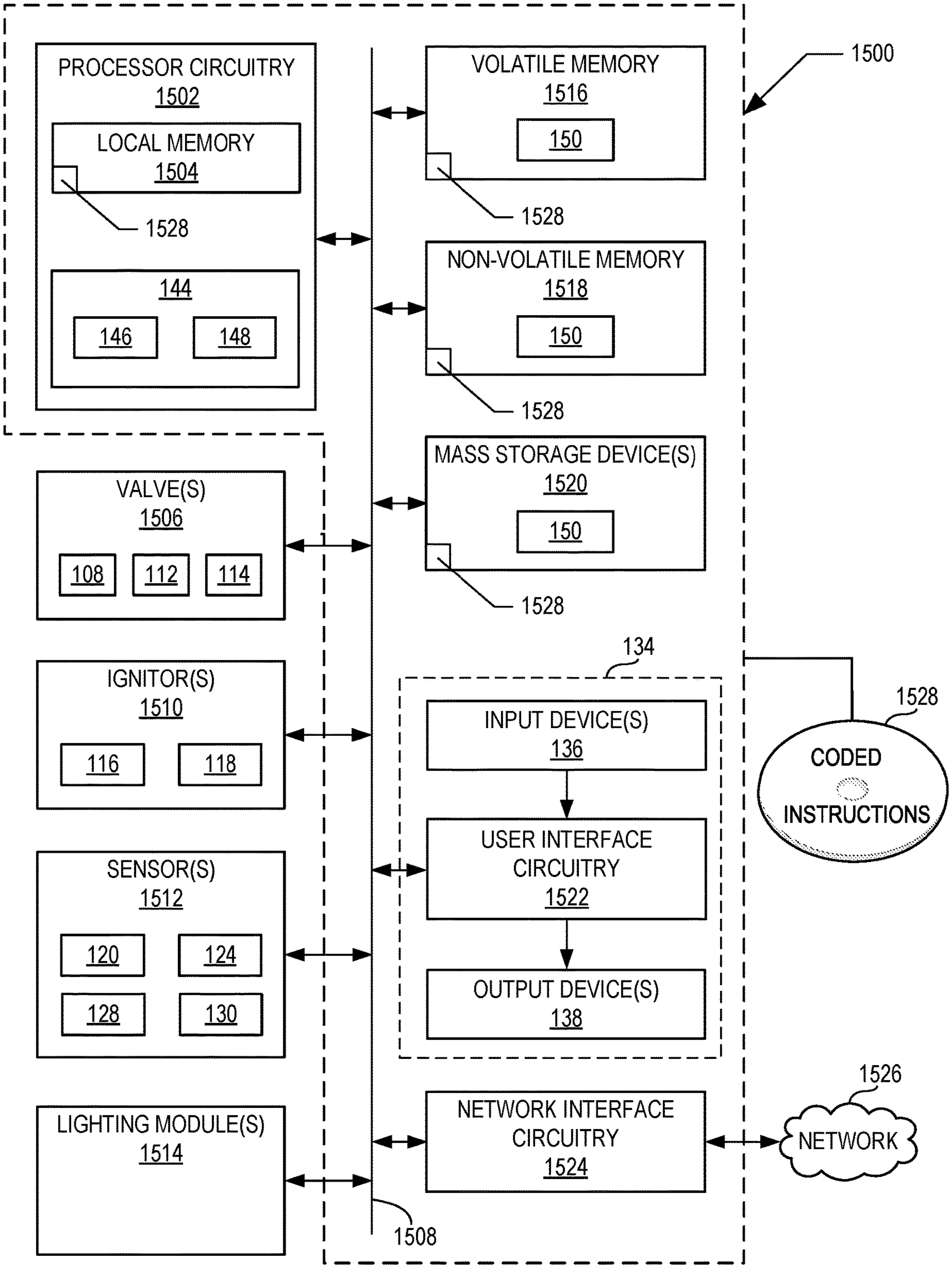
FIG. 15 is a block diagram of an example processor platform including processor circuitry structured to execute and/or instantiate the machine-readable instructions and/or operations of FIGS. 13-14 to implement the grill of FIG. 1.

FIG. 15 is a block diagram of an example processor platform 1500 including processor circuitry structured to execute and/or instantiate the machine-readable instructions and/or operations of FIGS. 13-14 to implement the grill 100 of FIG. 1. The processor platform 1500 of the illustrated example includes processor circuitry 1502. The processor circuitry 1502 of the illustrated example is hardware. For example, the processor circuitry 1502 can be implemented by one or more integrated circuit(s), logic circuit(s), FPGA(s), microprocessor(s), CPU(s), GPU(s), DSP(s), and/or microcontroller(s) from any desired family or manufacturer. The processor circuitry 1502 may be implemented by one or more semiconductor based (e.g., silicon based) device(s). In this example, the processor circuitry 1502 implements the controller 144 of FIG. 1, including the control circuitry 146 and the detection circuitry 148 of the controller 144.

The processor circuitry 1502 of the illustrated example includes a local memory 1504 (e.g., a cache, registers, etc.). The processor circuitry 1502 is in electrical communication with one or more valve(s) 1506 via a bus 1508. In this example, the valve(s) 1506 include the fuel source valve 108, the first burner valve 112, the second burner valve 114, and the "Nth" burner valve 115 of FIG. 1. The processor circuitry 1502 is also in electrical communication with one or more ignitor(s) 1510 via the bus 1508. In this example, the ignitor(s) 1510 include the first ignitor 116, the second ignitor 118, and the "Nth" ignitor 119 of FIG. 1. The processor circuitry 1502 is also in electrical communication with one or more sensor(s) 1512 via the bus 1508. In this example, the sensor(s) 1512 include the temperature sensor 128 and the flame sensor(s) 130 of FIG. 1. The processor circuitry 1502 is also in electrical communication with one or more user-interface assembly(ies) 1514 via the bus 1508. In this example, the user-interface assembly(ies) 1514 include the user-interface assemblies 120, 122, 124 of FIG. 1, which in turn include the lighting circuitries of the corresponding user-interface assemblies 600 of FIG. 6.

The processor circuitry 1502 is also in electrical communication with a main memory via the bus 1508, with the main memory including a volatile memory 1516 and a non-volatile memory 1518. The volatile memory 1516 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1518 may be implemented by flash memory and/or any other desired type of memory device. Access to the main memory 1516, 1518 of the illustrated example is controlled by a memory controller.

The processor platform 1500 of the illustrated example also includes one or more mass storage device(s) 1520 to store software and/or data. Examples of such mass storage device(s) 1520 include magnetic storage devices, optical storage devices, floppy disk drives, HDDs, CDs, Blu-ray disk drives, redundant array of independent disks (RAID) systems, solid state storage devices such as flash memory devices, and DVD drives. In the illustrated example of FIG. 15, one or more of the volatile memory 1516, the non-volatile memory 1518, and/or the mass storage device(s) 1520 implement(s) the memory 150 of FIG. 1.

The processor platform 1500 of the illustrated example also includes user interface circuitry 1522. The user interface circuitry 1522 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In the illustrated example, one or more input device(s) 136 are connected to the user interface circuitry 1522. The input device(s) 136 permit(s) a user to enter data and/or commands into the processor circuitry 1502. The input device(s) 136 can be implemented by, for example, one or more button(s), dial(s), knob(s), switch(es), touchscreen(s), audio sensor(s), microphone(s), image sensor(s), and/or camera(s). One or more output device(s) 138 are also connected to the user interface circuitry 1522 of the illustrated example. The output device(s) 138 can be implemented, for example, by one or more display device(s) (e.g., light emitting diode(s) (LED(s)), organic light emitting diode(s) (OLED(s)), liquid crystal display(s) (LCD(s)), cathode ray tube (CRT) display(s), in-place switching (IPS) display(s), touchscreen(s), etc.), tactile output device(s), and/or speaker(s). The user interface circuitry 1522 of the illustrated example, thus, typically includes a graphics driver card, a graphics driver chip, and/or graphics processor circuitry such as a GPU. In the illustrated example of FIG. 15, the user interface circuitry 1522, the input device(s) 136, and the output device(s) 138 collectively implement the user interface 134 of FIG. 1.

The processor platform 1500 of the illustrated example also includes network interface circuitry 1524. The network interface circuitry 1524 includes one or more communication device(s) (e.g., transmitter(s), receiver(s), transceiver(s), modem(s), gateway(s), wireless access point(s), etc.) to facilitate exchange of data with external machines (e.g., computing devices of any kind, including the remote device(s) 152 of FIG. 1) by a network 1526. The communication can be by, for example, an Ethernet connection, a digital subscriber line (DSL) connection, a telephone line connection, a coaxial cable system, a satellite system, a wireless system, a cellular telephone system, an optical connection, etc. In the illustrated example of FIG. 15, the network interface circuitry 1524 implements the network interface 140 (e.g., including the communication device(s) 142) of FIG. 1.

Coded instructions 1528 including the above-described machine-readable instructions and/or operations of FIGS. 13-14 may be stored the local memory 1504, in the volatile memory 1516, in the non-volatile memory 1518, on the mass storage device(s) 1520, and/or on a removable non-transitory computer-readable storage medium such as a flash memory stick, a dongle, a CD, or a DVD.

Figure 16:
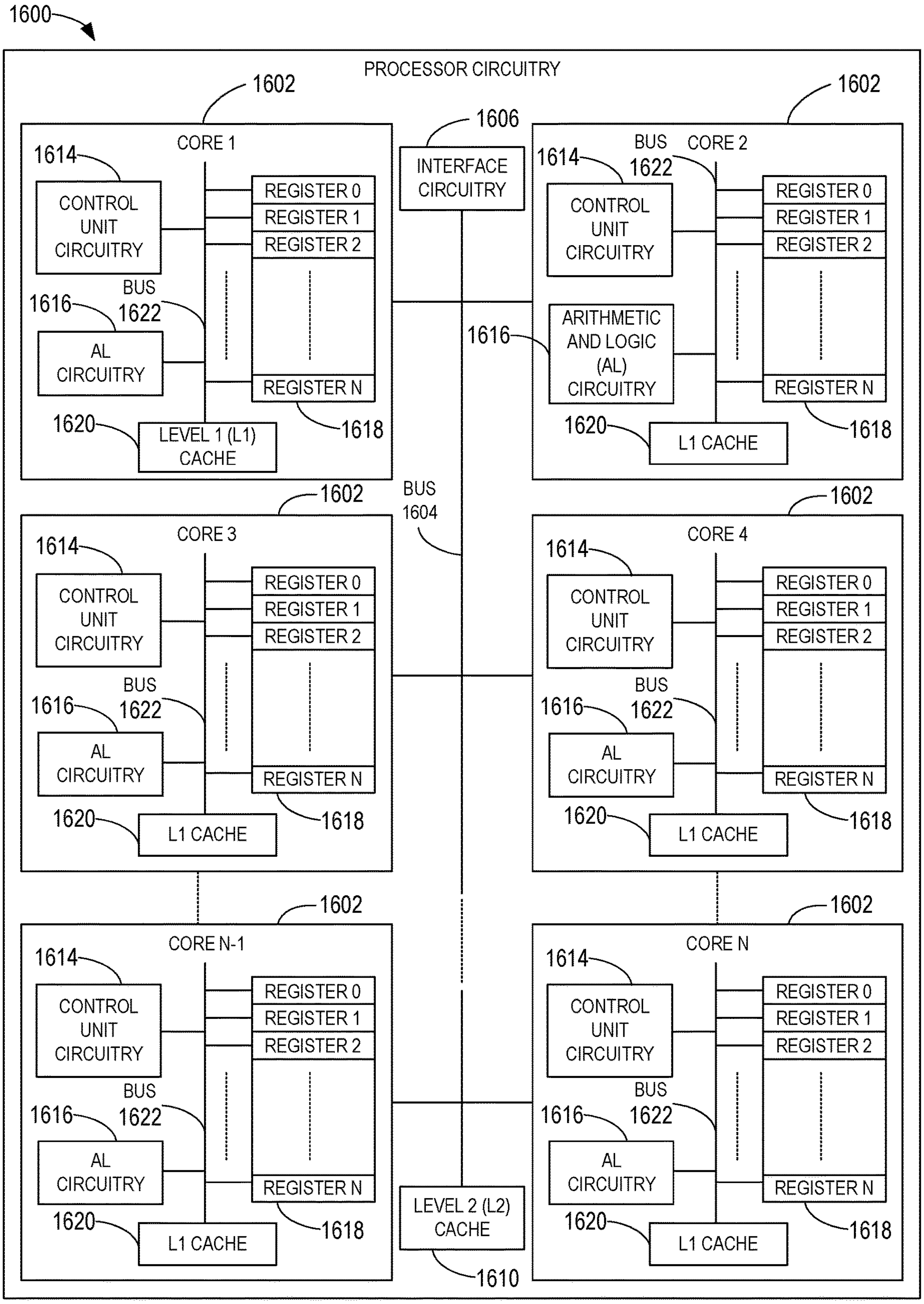
FIG. 16 is a block diagram of an example implementation of the processor circuitry of FIG. 15.

FIG. 16 is a block diagram of an example implementation of the processor circuitry 1502 of FIG. 15. In this example, the processor circuitry 1502 of FIG. 15 is implemented by a microprocessor 1600. For example, the microprocessor 1600 may implement multi-core hardware circuitry such as a CPU, a DSP, a GPU, an XPU, etc. Although it may include any number of example cores 1602 (e.g., 1 core), the microprocessor 1600 of this example is a multi-core semiconductor device including N cores. The cores 1602 of the microprocessor 1600 may operate independently or may cooperate to execute machine-readable instructions. For example, machine code corresponding to a firmware program, an embedded software program, or a software program may be executed by one of the cores 1602 or may be executed by multiple ones of the cores 1602 at the same or different times. In some examples, the machine code corresponding to the firmware program, the embedded software program, or the software program is split into threads and executed in parallel by two or more of the cores 1602. The software program may correspond to a portion or all of the machine-readable instructions and/or operations represented by the flowcharts of FIGS. 13-14.

The cores 1602 may communicate by an example bus 1604. In some examples, the bus 1604 may implement a communication bus to effectuate communication associated with one(s) of the cores 1602. For example, the bus 1604 may implement at least one of an Inter-Integrated Circuit (I2C) bus, a Serial Peripheral Interface (SPI) bus, a PCI bus, or a PCIe bus. Additionally, or alternatively, the bus 1604 may implement any other type of computing or electrical bus. The cores 1602 may obtain data, instructions, and/or signals from one or more external devices by example interface circuitry 1606. The cores 1602 may output data, instructions, and/or signals to the one or more external devices by the interface circuitry 1606. Although the cores 1602 of this example include example local memory 1620 (e.g., Level 1 (L1) cache that may be split into an L1 data cache and an L1 instruction cache), the microprocessor 1600 also includes example shared memory 1610 that may be shared by the cores (e.g., Level 2 (L2_ cache)) for high-speed access to data and/or instructions. Data and/or instructions may be transferred (e.g., shared) by writing to and/or reading from the shared memory 1610. The local memory 1620 of each of the cores 1602 and the shared memory 1610 may be part of a hierarchy of storage devices including multiple levels of cache memory and the main memory (e.g., the main memory 1516, 1518 of FIG. 15). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1602 may be referred to as a CPU, DSP, GPU, etc., or any other type of hardware circuitry. Each core 1602 includes control unit circuitry 1614, arithmetic and logic (AL) circuitry (sometimes referred to as an ALU) 1616, a plurality of registers 1618, the L1 cache 1620, and an example bus 1622. Other structures may be present. For example, each core 1602 may include vector unit circuitry, single instruction multiple data (SIMD) unit circuitry, load/store unit (LSU) circuitry, branch/jump unit circuitry, floating-point unit (FPU) circuitry, etc. The control unit circuitry 1614 includes semiconductor-based circuits structured to control (e.g., coordinate) data movement within the corresponding core 1602. The AL circuitry 1616 includes semiconductor-based circuits structured to perform one or more mathematic and/or logic operations on the data within the corresponding core 1602. The AL circuitry 1616 of some examples performs integer based operations. In other examples, the AL circuitry 1616 also performs floating point operations. In yet other examples, the AL circuitry 1616 may include first AL circuitry that performs integer based operations and second AL circuitry that performs floating point operations. In some examples, the AL circuitry 1616 may be referred to as an Arithmetic Logic Unit (ALU). The registers 1618 are semiconductor-based structures to store data and/or instructions such as results of one or more of the operations performed by the AL circuitry 1616 of the corresponding core 1602. For example, the registers 1618 may include vector register(s), SIMD register(s), general purpose register(s), flag register(s), segment register(s), machine specific register(s), instruction pointer register(s), control register(s), debug register(s), memory management register(s), machine check register(s), etc. The registers 1618 may be arranged in a bank as shown in FIG. 16. Alternatively, the registers 1618 may be organized in any other arrangement, format, or structure including distributed throughout the core 1602 to shorten access time. The bus 1622 may implement at least one of an I2C bus, a SPI bus (e.g., a serial bus), a PCI bus, or a PCIe bus.

Each core 1602 and/or, more generally, the microprocessor 1600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)), and/or other circuitry may be present. The microprocessor 1600 is a semiconductor device fabricated to include many transistors interconnected to implement the structures described above in one or more integrated circuits (Ics) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 17:
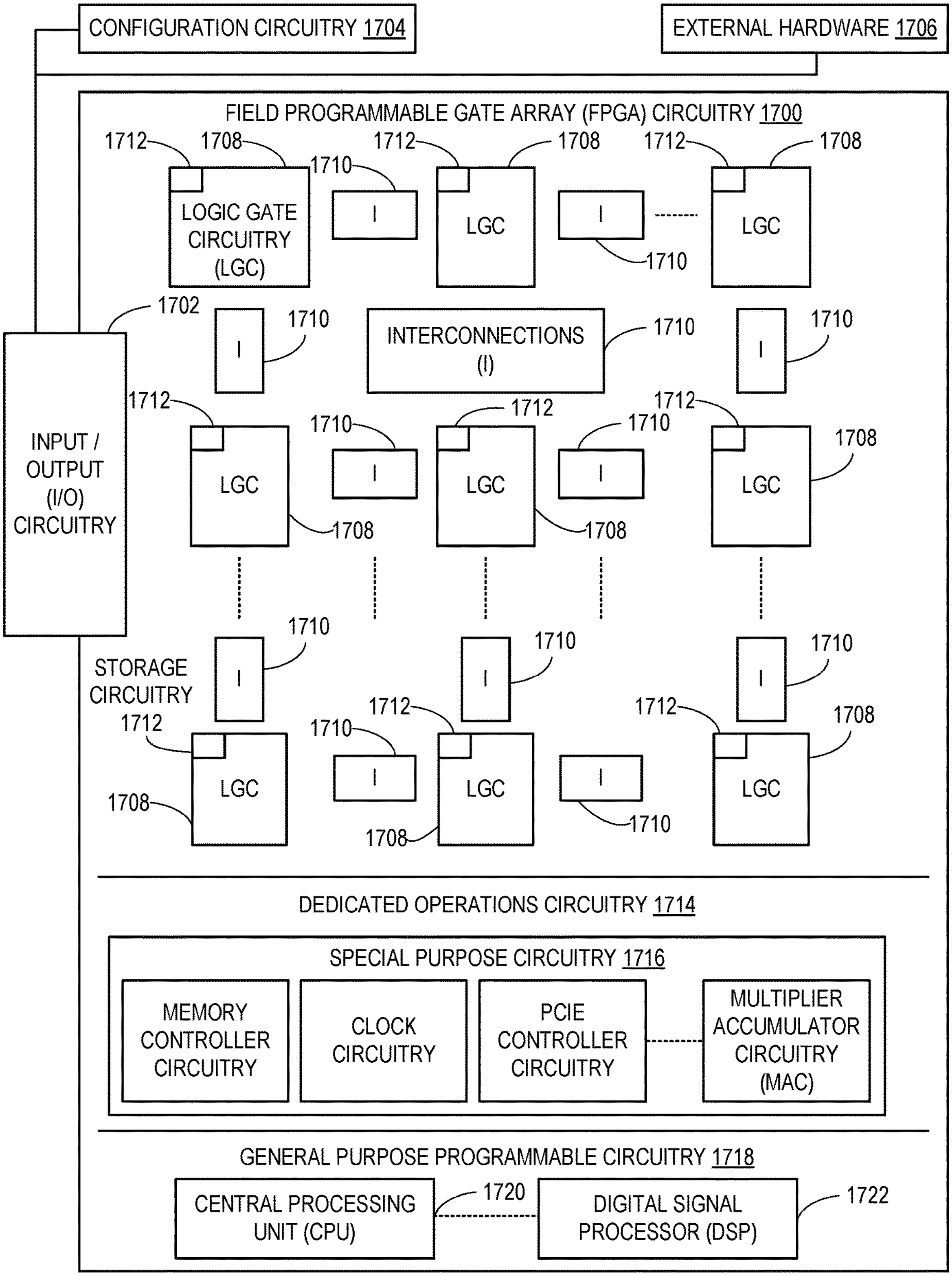
FIG. 17 is a block diagram of another example implementation of the processor circuitry of FIG. 15.

FIG. 17 is a block diagram of another example implementation of the processor circuitry 1502 of FIG. 15. In this example, the processor circuitry 1502 is implemented by FPGA circuitry 1700. The FPGA circuitry 1700 can be used, for example, to perform operations that could otherwise be performed by the example microprocessor 1600 of FIG. 16 executing corresponding machine-readable instructions. However, once configured, the FPGA circuitry 1700 instantiates the machine-readable instructions in hardware and, thus, can often execute the operations faster than they could be performed by a general purpose microprocessor executing the corresponding software.

More specifically, in contrast to the microprocessor 1600 of FIG. 16 described above (which is a general purpose device that may be programmed to execute some or all of the machine-readable instructions and/or operations represented by the flowcharts of FIGS. 13-14, but whose interconnections and logic circuitry are fixed once fabricated), the FPGA circuitry 1700 of the example of FIG. 17 includes interconnections and logic circuitry that may be configured and/or interconnected in different ways after fabrication to instantiate, for example, some or all of the machine-readable instructions and/or operations represented by the flowcharts of FIGS. 13-14. In particular, the FPGA circuitry 1700 may be thought of as an array of logic gates, interconnections, and switches. The switches can be programmed to change how the logic gates are interconnected by the interconnections, effectively forming one or more dedicated logic circuits (unless and until the FPGA circuitry 1700 is reprogrammed). The configured logic circuits enable the logic gates to cooperate in different ways to perform different operations on data received by input circuitry. Those operations may correspond to some or all of the software represented by the flowcharts of FIGS. 13-14. As such, the FPGA circuitry 1700 may be structured to effectively instantiate some or all of the machine-readable instructions of the flowcharts of FIGS. 13-14 as dedicated logic circuits to perform the operations corresponding to those software instructions in a dedicated manner analogous to an ASIC. Therefore, the FPGA circuitry 1700 may perform the operations corresponding to the some or all of the machine-readable instructions of FIGS. 13-14 faster than the general purpose microprocessor can execute the same.

In the example of FIG. 17, the FPGA circuitry 1700 is structured to be programmed (and/or reprogrammed one or more times) by an end user by a hardware description language (HDL) such as Verilog. The FPGA circuitry 1700 of FIG. 17 includes example input/output (I/O) circuitry 1702 to obtain and/or output data to/from example configuration circuitry 1704 and/or external hardware (e.g., external hardware circuitry) 1706. For example, the configuration circuitry 1704 may implement interface circuitry that may obtain machine-readable instructions to configure the FPGA circuitry 1700, or portion(s) thereof. In some such examples, the configuration circuitry 1704 may obtain the machine-readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 1706 may implement the microprocessor 1600 of FIG. 16. The FPGA circuitry 1700 also includes an array of example logic gate circuitry 1708, a plurality of example configurable interconnections 1710, and example storage circuitry 1712. The logic gate circuitry 1708 and interconnections 1710 are configurable to instantiate one or more operations that may correspond to at least some of the machine-readable instructions of FIGS. 12-14 and/or other desired operations. The logic gate circuitry 1708 shown in FIG. 17 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1708 to enable configuration of the electrical structures and/or the logic gates to form circuits to perform desired operations. The logic gate circuitry 1708 may include other electrical structures such as look-up tables (LUTs), registers (e.g., flip-flops or latches), multiplexers, etc.

The interconnections 1710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1708 to program desired logic circuits.

The storage circuitry 1712 of the illustrated example is structured to store result(s) of the one or more of the operations performed by corresponding logic gates. The storage circuitry 1712 may be implemented by registers or the like. In the illustrated example, the storage circuitry 1712 is distributed amongst the logic gate circuitry 1708 to facilitate access and increase execution speed.

The example FPGA circuitry 1700 of FIG. 17 also includes example Dedicated Operations Circuitry 1714. In this example, the Dedicated Operations Circuitry 1714 includes special purpose circuitry 1716 that may be invoked to implement commonly used functions to avoid the need to program those functions in the field. Examples of such special purpose circuitry 1716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1700 may also include example general purpose programmable circuitry 1718 such as an example CPU 1720 and/or an example DSP 1722. Other general purpose programmable circuitry 1718 may additionally or alternatively be present such as a GPU, an XPU, etc., that can be programmed to perform other operations.

Although FIGS. 16 and 17 illustrate two example implementations of the processor circuitry 1502 of FIG. 15, many other approaches are contemplated. For example, as mentioned above, modern FPGA circuitry may include an on-board CPU, such as one or more of the example CPU 1720 of FIG. 17. Therefore, the processor circuitry 1502 of FIG. 15 may additionally be implemented by combining the example microprocessor 1600 of FIG. 16 and the example FPGA circuitry 1700 of FIG. 17. In some such hybrid examples, a first portion of the machine-readable instructions and/or operations represented by the flowcharts of FIGS. 13-14 may be executed by one or more of the cores 1602 of FIG. 16 and a second portion of the machine-readable instructions and/or operations represented by the flowcharts of FIGS. 13-14 may be executed by the FPGA circuitry 1700 of FIG. 17.

In some examples, the processor circuitry 1502 of FIG. 15 may be in one or more packages. For example, the microprocessor 1600 of FIG. 16 and/or the FPGA circuitry 1700 of FIG. 17 may be in one or more packages. In some examples, an XPU may be implemented by the processor circuitry 1502 of FIG. 15, which may be in one or more packages. For example, the XPU may include a CPU in one package, a DSP in another package, a GPU in yet another package, and an FPGA in still yet another package.

From the foregoing, it will be appreciated that the above-disclosed methods and apparatus advantageously provide "control-by-wire" architectures for grills (e.g., gas grills) that eliminate the mechanical connection which conventionally exists between each control knob of the grill and each corresponding burner valve of the grill. In some examples, the above-described "control-by-wire" architectures can be implemented using an addressing block as a component of an input wiring harness to identify, to a user-interface assembly, an identifier to be used by the user-interface assembly. Furthermore, example approaches disclosed herein utilize differential signaling to communicate via such electrical connectors, thereby reducing the effects of electrical noise. Advantageously, utilizing a daisy-chain configuration as disclosed herein enables a reduction in overall wiring and wiring complexity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A user-interface assembly for use in a gas grill, the user-interface assembly comprising:
   - a user interface element;
   - a sensor to detect a user interaction with the user interface element;
   - lighting circuitry including a plurality of light emitting diodes; and
   - user-interface controller circuitry to identify an addressing block connected via an input wiring harness, the user-interface controller circuitry to select an address to be used to communicate with a central controller of the gas grill.

2. The user-interface assembly of claim 1, further including:
   - an input connector;
   - an output connector; and
   - a differential controller bus connecting the input connector to the output connector.

3. The user-interface assembly of claim 2, further including a differential signal translator connecting the user-interface controller circuitry to the differential controller bus, the differential signal translator to convert differential communications carried by the differential controller bus to non-differential communications for use by the user-interface controller circuitry.

4. The user-interface assembly of claim 2, wherein the differential controller bus is implemented using a differential inter-integrated circuit communication protocol.

5. The user-interface assembly of claim 2, wherein the differential controller bus is implemented using a differential serial communication protocol.

6. The user-interface assembly of claim 2, further including:
   - a first differential signal translator to connect the lighting circuitry to the input connector; and
   - a second differential signal translator to connect the lighting circuitry to the output connector.

7. The user-interface assembly of claim 1, further including addressing terminals positioned adjacent to an input connector, the addressing terminals and the input connector to be connected to the input wiring harness.

8. The user-interface assembly of claim 1, wherein the input wiring harness includes the addressing block.

9. The user-interface assembly of claim 1, wherein the user-interface assembly is a first user-interface assembly, and the input wiring harness is to couple the first user-interface assembly to a second user-interface assembly.

10. The user-interface assembly of claim 1, wherein the user-interface controller circuitry is in communication with an input/output device separate from the knob sensor.

11. The user-interface assembly of claim 10, wherein the input/output device includes at least one of a touchscreen display, an electromechanical input, an actuator, or a servo.

12. The user-interface assembly of claim 1, wherein the user interface element is a control knob, and the sensor is a knob sensor that is to detect a rotational position of the control knob.

13. The user-interface assembly of claim 1, wherein the user interface element includes a plurality of buttons, and the sensor is to detect user interaction with at least one of the plurality of buttons.

* * * * *